(12) United States Patent
Kim

(10) Patent No.: US 12,481,384 B2
(45) Date of Patent: Nov. 25, 2025

(54) DISPLAY PANEL AND ELECTRONIC DEVICE

(71) Applicant: Samsung Display Co., LTD., Yongin-si (KR)

(72) Inventor: Jeongwoo Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/672,250

(22) Filed: May 23, 2024

(65) Prior Publication Data

US 2025/0199633 A1      Jun. 19, 2025

(30) Foreign Application Priority Data

Dec. 15, 2023   (KR) .......................... 10-2023-0182948

(51) Int. Cl.
G06F 3/041         (2006.01)
(52) U.S. Cl.
CPC ........ *G06F 3/0412* (2013.01); *G06F 3/04164* (2019.05)
(58) Field of Classification Search
CPC ............. H01L 27/3206; H01L 27/3209; H01L 27/3213; H01L 27/323; H01L 54/5016; H01L 51/5203; H01L 51/5237; H01L 51/5265; H01L 2251/5376; H01L 27/335; H01L 27/3246

See application file for complete search history.

(56) References Cited

U.S. PATENT DOCUMENTS

| 11,424,298 | B2 | 8/2022 | Li et al. |
| 11,910,687 | B2 | 2/2024 | Lee et al. |
| 2016/0118626 | A1* | 4/2016 | Seo .................. H10K 50/11 |
| | | | 257/89 |
| 2022/0149335 | A1* | 5/2022 | Hai .................. H10K 59/122 |
| 2022/0406851 | A1* | 12/2022 | Lee .................. H10K 59/352 |
| 2023/0217793 | A1 | 7/2023 | Lee et al. |

FOREIGN PATENT DOCUMENTS

| CN | 108183110 A | 6/2018 |
| CN | 115268676 A | 11/2022 |
| KR | 1020220170409 A | 12/2022 |
| KR | 1020230102701 A | 7/2023 |

* cited by examiner

*Primary Examiner* — Shaheda A Abdin
(74) *Attorney, Agent, or Firm* — CANTOR COLBURN LLP

(57) ABSTRACT

A display panel includes a substrate including sub-display areas and transmission areas, display elements disposed on the substrate to correspond to the sub-display areas, respectively, a touch electrode layer disposed on the display elements, where the touch electrode layer defines a first first opening overlapping one of the sub-display areas and a first second opening and a second second opening overlapping two transmission areas of the transmission areas, respectively, where the first second opening and the second second opening is adjacent to the first first opening. The first second opening is arranged in a first direction with respect to the first first opening, the second second opening is arranged in a second direction with respect to the first first opening, and at least one selected from the first second opening and the second second opening is spatially connected to the first first opening.

20 Claims, 19 Drawing Sheets

DISPLAY PANEL AND ELECTRONIC DEVICE

This application claims priority to Korean Patent Application No. 10-2023-0182948, filed on Dec. 15, 2023, and all the benefits accruing therefrom under 35 U.S.C. § 119, the content of which in its entirety is herein incorporated by reference.

BACKGROUND

1. Field

One or more embodiments relate to a display panel and an electronic device including the display panel.

2. Description of the Related Art

Generally, in a display panel such as an organic light-emitting display panel, thin-film transistors are arranged in a display area in order to adjust the brightness, etc. of a light-emitting diode. The thin-film transistors may receive a data signal, a driving voltage, and a common voltage transmitted thereto to control the light-emitting diode corresponding thereto to emit light having a certain color.

An electronic device may be a display apparatus including a display panel. The electronic device may include a component disposed below the display panel. The component may include a sensor, a camera, etc. Also, the component may emit or sense light such as visible rays and/or infrared rays.

SUMMARY

A display panel may include touch electrodes configured to sense a touch input by a user. Also, the display panel may include a light-blocking layer to prevent lower layers from reflecting external light and becoming visible. A component area in which a component is arranged may include a transmission area to improve the light transmittance rate of the display panel. In such a display panel, the touch electrodes and the light-blocking layer may have a mesh shape to realize the transmission area in plural. In some areas, a portion of the mesh shape of the light-blocking layer may be lost. In this case, the touch electrode disposed below the light-blocking layer may reflect external light and may glitter to become visible.

One or more embodiments include a display panel capable of reducing the visibility of a touch electrode in a component area and an electronic device including the display panel. However, this objective is an example and does not limit the scope of the disclosure.

Additional aspects will be set forth in part in the description which follows and, in part, will be apparent from the description, or may be learned by practice of embodiments of the invention described herein.

According to one or more embodiments, a display panel includes a substrate including a plurality of sub-display areas and a plurality of transmission areas, a plurality of display elements disposed on the substrate to correspond to the plurality of sub-display areas, respectively, a touch electrode layer disposed on the plurality of display elements, where the touch electrode layer defines a first first opening overlapping one of the plurality of sub-display areas and a first second opening and a second second opening overlapping two transmission areas of the plurality of transmission areas, respectively, where the first second opening and the second second opening is adjacent to the first first opening, and a light-blocking layer disposed on the touch electrode layer, where the light-blocking layer defines a first first upper opening overlapping the first first opening, a first second upper opening overlapping the first second opening, and a second second upper opening overlapping the second second opening, where the first second opening is arranged in a first direction with respect to the first first opening, the second second opening is arranged in a second direction with respect to the first first opening, and at least one selected from the first second opening and the second second opening is spatially connected to the first first opening.

In an embodiment, the touch electrode layer may further include lines at least partially surrounding the first first opening, the first second opening, and the second second opening, respectively, and the lines may overlap the light-blocking layer.

In an embodiment, the display panel may further include a first touch insulating layer disposed below the lines and a second touch insulating layer disposed above the lines, wherein a lower surface of the second touch insulating layer directly below a light-blocking portion of the light-blocking layer arranged between at least any one selected from the first second upper opening and the second second upper opening of the light-blocking layer and the first first upper opening of the light-blocking layer may be in direct contact with an upper surface of the first touch insulating layer.

In an embodiment, one selected from the first second opening and the second second opening may be spatially separated from the first first opening by a corresponding one of the lines of the touch electrode layer.

In an embodiment, the first first upper opening and the first second upper opening may be spatially connected to each other.

In an embodiment, the display panel may further include a touch insulating layer disposed between the light-blocking layer and the touch electrode layer and an overcoat layer disposed on the light-blocking layer, where the touch insulating layer and the overcoat layer may be in direct contact with each other in an area between the first first upper opening and the first second upper opening.

In an embodiment, the touch electrode layer may further define a second first opening overlapping a sub-display area adjacent to the second second opening and a third second opening overlapping a transmission area adjacent to the second first opening, and at least one selected from the second second opening and the third second opening may be spatially connected to the second first opening.

According to one or more embodiments, an electronic device includes a display panel including a main display area and a component area and a component disposed on a bottom surface of the display panel and overlapping the component area, where the display panel includes a substrate including a plurality of sub-display areas and a plurality of transmission areas in the component area, a plurality of display elements disposed on the substrate to correspond to the plurality of sub-display areas, respectively, a touch electrode layer disposed on the plurality of display elements, where the touch electrode layer defines a first first opening overlapping one of the plurality of sub-display areas and a first second opening and a second second opening overlapping two transmission areas of the plurality of transmission areas, respectively, the first second opening and the second second opening being adjacent to the first first opening, and a light-blocking layer disposed on the touch electrode layer, where the light-blocking layer defines a first first upper opening overlapping the first first opening, a first second upper opening overlapping the first second opening, and a second second upper opening overlapping the second second opening, where the first second opening is arranged in a first direction with respect to the first first opening, the second second opening is arranged in a second direction with respect to the first first opening, and at least one selected from the first second opening and the second second opening is spatially connected to the first first opening.

In an embodiment, the display panel may further include a first touch insulating layer disposed below the touch electrode layer and a second touch insulating layer disposed above the touch electrode layer, where a lower surface of the second touch insulating layer directly below a light-blocking portion of the light-blocking layer arranged between at least one selected from the first second upper opening and the second second upper opening of the light-blocking layer and the first first upper opening of the light-blocking layer may be in direct contact with an upper surface of the first touch insulating layer.

In an embodiment, the display panel may further include a touch insulating layer disposed between the light-blocking layer and the touch electrode layer and an overcoat layer disposed on the light-blocking layer, where the first first upper opening and the first second upper opening may be spatially connected to each other, and the touch insulating layer and the overcoat layer may be in direct contact with each other in an area between the first first upper opening and the first second upper opening.

According to one or more embodiments, a display panel includes a substrate including a sub-display area and a transmission area adjacent to the sub-display area, a display element disposed on the substrate to correspond to the sub-display area, and a touch electrode layer disposed on the display element and including an opening overlapping the sub-display area, where the touch electrode layer further includes a line at least partially surrounding the opening, and a width of a first portion of the line is less than a width of a second portion of the line.

In an embodiment, the display panel may further include a light-blocking layer disposed on the touch electrode layer, where the light-blocking layer defines an upper opening overlapping the opening of the touch electrode layer, and the light-blocking layer includes a light-blocking portion at least partially surrounding the upper opening, where a width of a first portion of the light-blocking portion may be less than a width of a second portion of the light-blocking portion.

In an embodiment, the first portion of the light-blocking portion may overlap the first portion of the line of the touch electrode layer, and the second portion of the light-blocking portion may overlap the second portion of the line of the touch electrode layer.

In an embodiment, a width of the line of the touch electrode layer may be less than a width of the light-blocking portion of the light-blocking layer.

In an embodiment, the display element may include a first electrode, a bank layer covering an edge of the first electrode, where the bank layer defines an emission opening overlapping the first electrode, an emission layer overlapping the first electrode through the emission opening of the bank layer, and a second electrode on the emission layer, where the bank layer may include a light-absorptive material.

In an embodiment, a bank portion of the bank layer surrounding the emission opening may overlap the line of the touch electrode layer, and a width of the line of the touch electrode layer may be less than a width of the bank portion of the bank layer.

In an embodiment, the bank layer may include a transmission opening overlapping the transmission area.

According to one or more embodiments, an electronic device includes a display panel including a main display area and a component area and a component disposed on a bottom surface of the display panel and overlapping the component area, wherein the display panel includes a substrate including a sub-display area and a transmission area adjacent to the sub-display area, a display element disposed on the substrate to correspond to the sub-display area, and a touch electrode layer disposed on the display element, where the touch electrode layer defines an opening overlapping the sub-display area, where the touch electrode layer further includes a line at least partially surrounding the opening, and a width of a first portion of the line is less than a width of a second portion of the line.

In an embodiment, the display panel may further include a light-blocking layer disposed on the touch electrode layer, where the light-blocking layer defines an upper opening overlapping the opening of the touch electrode layer and a light-blocking portion at least partially surrounding the upper opening, where a width of a first portion of the light-blocking portion may be less than a width of a second portion of the light-blocking portion.

In an embodiment, the line of the touch electrode layer may overlap the light-blocking portion of the light-blocking layer, and a width of the line of the touch electrode layer may be less than a width of the light-blocking portion of the light-blocking layer.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
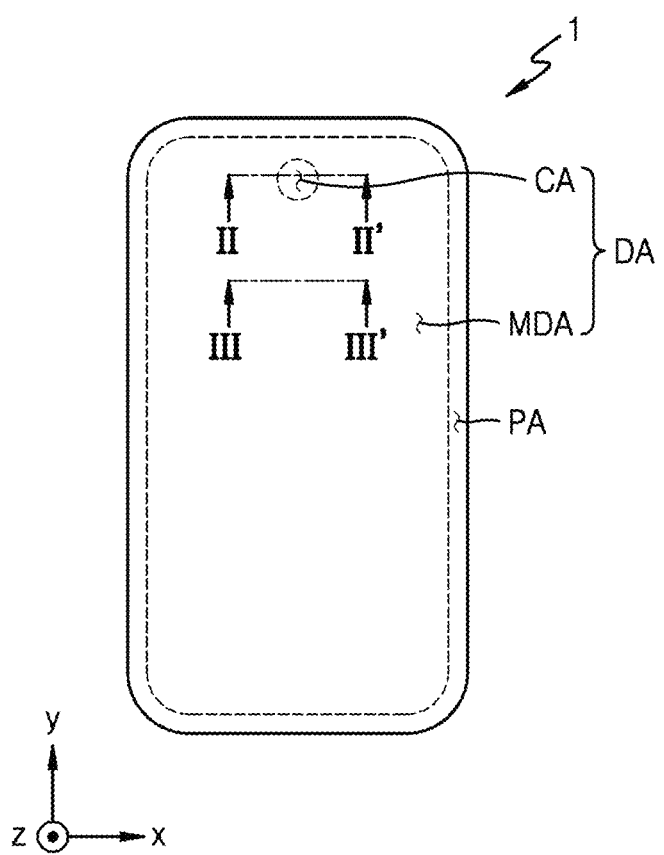
FIG. 1 is a schematic plan view of a display apparatus according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b or c" or "at least one selected from a, b and c" indicates only a, only b, only c, both a and b, both a and c, both b and c, all of a, b, and c, or variations thereof.

While the disclosure is capable of various modifications and alternative forms, embodiments thereof are shown by way of example in the drawings and will herein be described in detail. Effects and characteristics of the disclosure and methods of achieving the same will become apparent by referring to the embodiments described in detail below along with the drawings. However, the disclosure is not limited to the embodiments disclosed hereinafter and may be realized in various forms.

Hereinafter, embodiments will be described in detail by referring to the accompanying drawings. In descriptions with reference to the drawings, the same reference numerals are given to elements that are the same or substantially the same and descriptions will not be repeated.

In embodiments to be described hereinafter, when elements, such as a layer, a film, an area, a plate, etc. are referred to as being "on" another element, the reference may indicate not only a case where the element is "directly on" the other element, but also a case where yet another element is between the element and the other element. Also, for convenience of illustration and description, elements in the drawings may have exaggerated or reduced sizes. For example, sizes and thicknesses of the elements in the drawings are randomly indicated for convenience of illustration and description, and thus, the disclosure is not necessarily limited to the illustrations of the drawings.

In the embodiments hereinafter, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

It will be understood that although the terms "first," "second," etc. may be used herein to describe various components, these components should not be limited by these terms. These components are only used to distinguish one component from another.

It will be further understood that the terms "comprises" and/or "comprising" or "includes" and/or "including" when used herein specify the presence of stated features, regions, integers, steps, operations, elements, and/or components, but do not preclude the presence or addition of one or more other features, regions, integers, steps, operations, elements, components, and/or groups thereof.

In this specification, the expression "A and/or B" may indicate A, B, or A and B. Also, the expression "at least one of A and B" or "at least one selected from A and B" may indicate A, B, or A and B.

In the embodiments hereinafter, it will be understood that when a layer, an area, or an element is referred to as being connected to another layer, area, or element, it can be directly or indirectly connected to the other layer, area, or element. For example, it will be understood in this specification that when a layer, an area, or an element is referred to as being in contact with or being electrically connected to another layer, area, or element, it can be directly or indirectly in contact with or electrically connected to the other layer, area, or element.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a schematic plan view of a display apparatus according to an embodiment.

The display apparatus according to an embodiment may include an electronic device, such as a smartphone, a cellular phone, a navigation device, a game machine, a television (TV), a vehicle head unit, a notebook computer, a laptop computer, a tablet computer, a personal media player (PMP), a personal digital assistant (PDA), or the like. In an embodiment, the electronic device may be a flexible device.

The display apparatus may include a display area DA and a peripheral area PA outside the display area DA. In a plan view (or when viewed in a z direction), the display area DA may have an approximately rectangular shape, as illustrated in FIG. 1. However, the disclosure is not limited thereto. The display area DA may have a polygonal shape, such as a triangular shape, a pentagonal shape, a hexagonal shape, or the like, a circular shape, an oval shape, or an amorphous shape. A corner of an edge of the display area DA may have a round shape. The peripheral area PA may be a type of non-display area in which display elements are not arranged. The peripheral area PA may entirely surround the display area DA.

In the display area DA, pixels including various display elements such as an organic light-emitting diode may be arranged. The pixels may be arranged in various forms in an x direction and/or a y direction, for example, in a stripe arrangement, a pentile arrangement, or a mosaic arrangement in the x direction and/or the y direction and may display an image.

The display area DA may include a main display area MDA and a component area CA. The main display area MDA may have a shape surrounding the component area CA. However, the disclosure is not limited thereto, and various modifications thereto may be possible. In an embodiment, for example, a portion of the component area CA may be in contact with the peripheral area PA. That is, the main display area MDA may at least partially surround the component area CA.

As described below with reference to FIG. 2, a component 40 (see FIG. 2), which is an electronic element, may be arranged to correspond to the component area CA.

When viewed in a direction (the z direction) approximately perpendicular to an upper surface of the display apparatus 1 (a plane defined by the x direction and the y direction), the component area CA may have a polygonal shape, such as a triangular shape, a quadrangular shape, a pentagonal shape, or a hexagonal shape, a circular shape, an oval shape, a star shape, or an amorphous shape.

FIG. 1 illustrates an embodiment where the display area DA includes a single component area CA. However, the disclosure is not limited thereto. According to another embodiment, the display apparatus 1 may include a plurality of component areas that are apart from each other. In such an embodiment, sizes of the plurality of component areas may be different from each other if desired.

Figure 2:
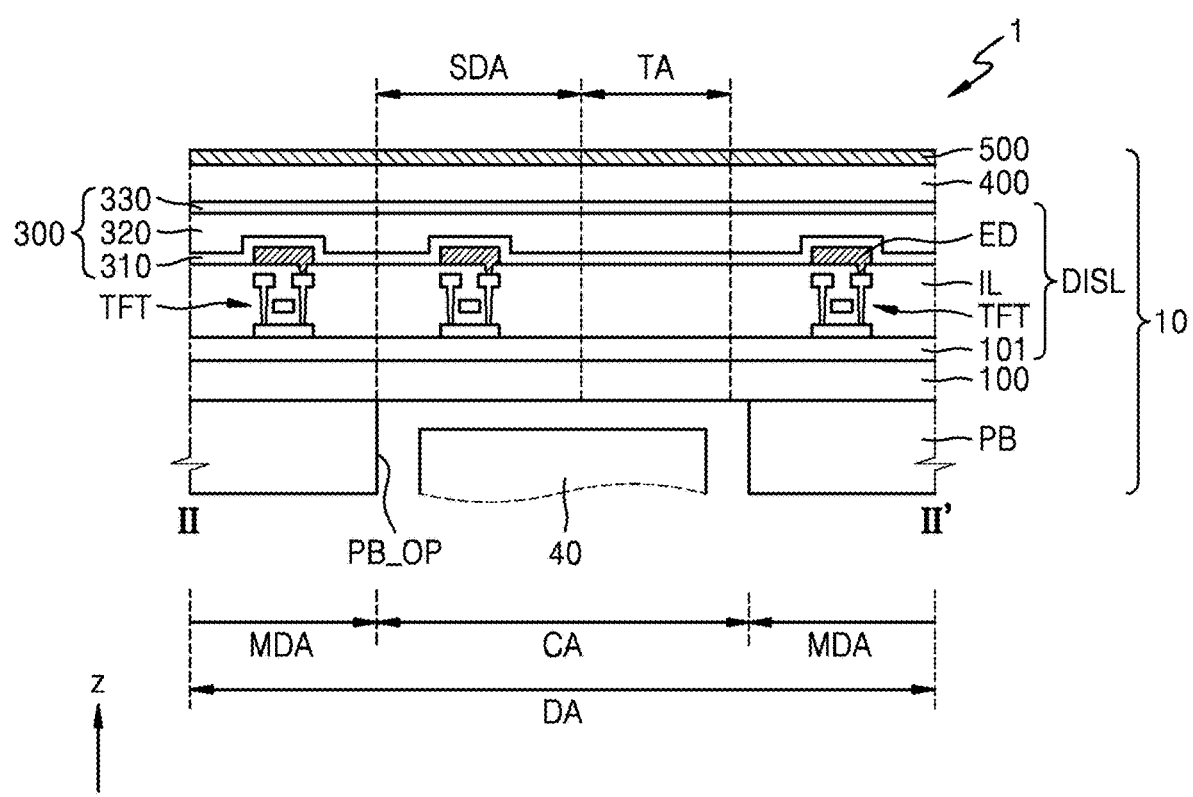
FIG. 2 is a cross-sectional view of the display apparatus of FIG. 1, taken along line II-II'.

FIG. 2 is a schematic cross-sectional view of a portion of the display apparatus 1 of FIG. 1. Particularly, FIG. 2 may be a schematic cross-sectional view of the display apparatus 1 of FIG. 1, taken along line II-II'.

Referring to FIG. 2, an embodiment of the display apparatus 1 may include a display panel 10 and the component 40 disposed to overlap the display panel 10. A cover window (not shown) for protecting the display panel 10 may be disposed above the display panel 10.

The display area DA of the display panel 10 may include the component area CA and the main display area MDA. The main display area MDA may display a main image, and the component area CA may display an auxiliary image. The component 40 may be disposed below the display panel 10 to correspond to the component area CA. That is, when viewed in a direction (the z direction) approximately perpendicular to the display apparatus 1, the component area CA may overlap the component 40.

The component area CA may include a transmission area TA for transmitting light and/or sound, which is output from the component 40 to the outside or proceeding from the outside toward the component 40.

The component 40 may include an electronic element using light or sound. In an embodiment, for example, the electronic element may include a proximity sensor configured to measure a distance, a sensor configured to recognize a body part (for example, a fingerprint, an iris, a face, etc.) of a user, a small lamp configured to output light, an illuminance sensor configured to measure brightness, an image sensor (for example, a camera) configured to capture an image, and the like. The electronic element using light may use light of various wavelength ranges, such as visible rays, infrared rays, ultraviolet rays, etc. The electronic element using sound may use ultrasonic sound waves or sound of other frequency bands. According to some embodiments, the component 40 may include sub-components, such as a light emitter and a light receiver. The component 40 may include a light emitter and a light receiver that are integral to each other or may include a pair of a light emitter and a light receiver that are physically separate from each other.

In the display apparatus 1 according to an embodiment, where light is to be transmitted through the component area CA, the light transmittance may be about 10% or greater, about 20% or greater, about 30% or greater, about 40% or greater, about 50% or greater, about 60% or greater, about 70% or greater, about 75% or greater, about 80% or greater, about 85% or greater, or about 90% or greater.

In an embodiment, as shown in FIG. 2, the display panel 10 may include a substrate 100, a display layer DISL on the substrate 100, a touch layer 400, a reflection prevention layer 500, and a panel protection member PB below the substrate 100.

The substrate 100 may include glass, metal, or polymer resins. In an embodiment where the display panel 10 is flexible or bendable, the substrate 100 may include polymer resins, such as polyethersulfone, polyacrylate, polyetherimide, polyethylene naphthalate, polyethylene terephthalate, polyphenylene sulfide, polyarylate, polyimide, polycarbonate, or cellulose acetate propionate. However, various modifications of the substrate 100 may be possible. In an embodiment, for example, the substrate 100 may have a multi-layered structure including: two layers including the polymer resins described above; and a barrier layer between the two layers, the barrier layer including an inorganic material (such as silicon oxide, silicon nitride, silicon oxynitride, or the like).

The display layer DISL may include a pixel circuit including thin-film transistors TFTs, a light-emitting device ED, which is a display element, and a thin-film encapsulation layer 300. FIG. 2 illustrates an embodiment where the display layer DISL may include a buffer layer 101 and the thin-film transistor TFT, etc. may be disposed on the buffer layer 101. The light-emitting device ED may include an organic light-emitting diode OLED. The pixel circuit including the thin-film transistor TFT may control whether or not light is to be emitted by the light-emitting device ED, the degree of light emission, etc. An insulating layer IL for insulation between an active layer, a gate electrode, and/or source/drain electrodes of the thin-film transistor TFT may also be included in the display layer DISL.

The light-emitting device ED may be arranged not only in the main display area MDA but also in the component area CA. That is, the component area CA may include sub-display areas SDA and transmission areas TA, where the light-emitting devices ED may be arranged in the sub-display areas SDA. The transmission area TA may be defined as an area where the light-emitting devices ED are not arranged in the component area CA. The transmission area TA may be an area through which light/a signal emitted from or incident into the component 40 may be transmitted, the component 40 being arranged to correspond to the component area CA. The thin-film transistor TFT electrically connected to the light-emitting device ED arranged in the component area CA may be arranged in the component area CA, as illustrated in FIG. 2, or may be arranged in the main display area MDA and may be, via a line, etc., electrically connected to the light-emitting device ED arranged in the component area CA.

The display elements, such as the light-emitting device ED, may be covered by the thin-film encapsulation layer 300, as illustrated in FIG. 2. Alternatively, the display elements may be covered by a sealing substrate. The thin-film encapsulation layer 300 may include at least one inorganic encapsulation layer and at least one organic encapsulation layer, as illustrated in FIG. 2. In an embodiment, for example, the thin-film encapsulation layer 300 may include a first inorganic encapsulation layer 310, a second inorganic encapsulation layer 330, and an organic encapsulation layer 320 therebetween.

The first and second inorganic encapsulation layers 310 and 330 may include at least one inorganic insulating material, such as, $SiO_2$, $SiN_x$, SiON, $Al_2O_3$, $TiO_2$, $Ta_2O_5$, $HfO_2$, or $ZnO_x$. The organic encapsulation layer 320 may include a polymer-based material. The polymer-based material may include silicon-based resins, acryl-based resins (for example, polymethylmethacrylate, polyacrylic acid, etc.), epoxy-based resins, polyimide, polyethylene, etc.

Each of the first inorganic encapsulation layer 310, the organic encapsulation layer 320, and the second inorganic encapsulation layer 330 may be integrally or commonly formed to cover the main display area MDA and the component area CA.

The touch layer 400 may obtain coordinate information corresponding to an external input, for example, a touch event. The touch layer 400 may include a touch electrode and touch lines connected to the touch electrode. The touch layer 400 may sense the external input based on a magnetic capacitance method or a mutual capacitance method.

In an embodiment, the touch layer 400 may be disposed on the thin-film encapsulation layer 300. Alternatively, the touch layer 400 may be separately formed on a touch substrate and then may be disposed on the thin-film encapsulation layer 300 through an adhesive layer, such as an optical clear adhesive (OCA). According to an embodiment, the touch layer 400 may be formed directly above the thin-film encapsulation layer 300, and in such an embodiment, the adhesive layer may not be disposed between the touch layer 400 and the thin-film encapsulation layer 300.

The reflection prevention layer 500 may reduce the degree in which light (external light) incident from the outside toward the display apparatus 1 is reflected from the display apparatus 1. In an embodiment, the reflection prevention layer 500 may include a light-blocking layer and color filters and may also include an overcoat layer if desired. A detailed structure of the reflection prevention layer 500 will be described below.

A cover window (not shown) may be disposed above the display panel 10, that is, above the reflection prevention layer 500, to protect the display panel 10. The cover window may be coupled to the reflection prevention layer 500 via an adhesive layer, such as an OCA. The cover window may include a glass material or a plastic material. The glass material may include ultra-thin Glass™ (UTG™). The plastic material may include at least one selected from polyethersulfone, polyacrylate, polyetherimide, polyethylene naphthalate, polyethylene terephthalate, polyphenylene sulfide, polyarylate, polyimide, polycarbonate, cellulose acetate propionate, etc.

The panel protection member PB may be coupled under the substrate 100 to support and protect the substrate 100. The panel protection member PB may include an opening PB_OP corresponding to the component area CA. The panel protection member PB may include the opening PB_OP so that the light transmittance of the component area CA may be improved. The panel protection member PB may include polyethylene terephthalate or polyimide.

An area of the component area CA may be greater than an area of the component 40. Accordingly, an area of the opening PB_OP provided in the panel protection member PB may not correspond to the area of the component area CA. FIG. 2 illustrates an embodiment where at least a portion of the component 40 is inserted into the opening PB_OP provided in the panel protection member PB. However, the component 40 may also be arranged to be apart from the display panel 10.

Figure 3:
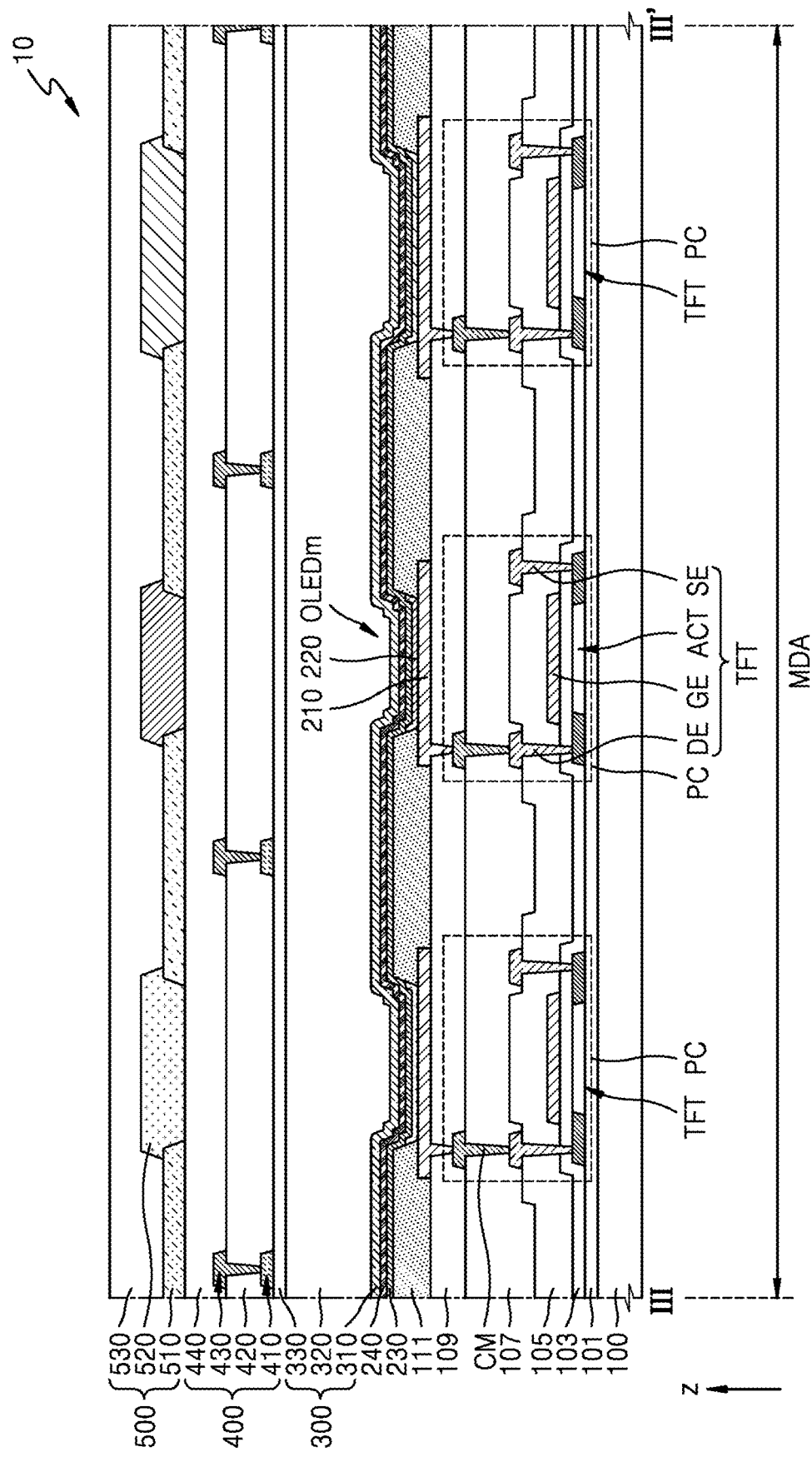
FIG. 3 is a cross-sectional view of the display apparatus of FIG. 1, taken along line III-III'.

FIG. 3 is a schematic cross-sectional view of a portion of the display apparatus 1 of FIG. 1. Particularly, FIG. 3 is a cross-sectional view of the display apparatus 1 of FIG. 1, taken along line III-III'. That is, FIG. 3 is a cross-sectional view of the main display area MDA of the display apparatus 1 of FIG. 1.

Referring to FIG. 3, the display panel 10 may include a plurality of organic light-emitting diodes arranged in the main display area MDA. To distinguish the plurality of organic light-emitting diodes in FIG. 3 from organic light-emitting diodes arranged in the component area to be described below, the organic light-emitting diodes arranged in the main display area MDA will be referred to as main organic light-emitting diodes OLEDm hereinafter. The plurality of main organic light-emitting diodes OLEDm and pixel circuits PC respectively corresponding to the plurality of main organic light-emitting diodes OLEDm may be arranged in the main display area MDA. Each pixel circuit PC may include a thin-film transistor TFT electrically connected to the main organic light-emitting diode OLEDm.

Each main organic light-emitting diode OLEDm may emit light of a different color. According to an embodiment, each main organic light-emitting diode OLEDm may emit red light, green light, or blue light. According to another embodiment, each main organic light-emitting diode OLEDm may emit red light, green light, blue light, or white light. One sub-pixel may include one main organic light-emitting diode OLEDm and the thin-film transistor TFT corresponding thereto. One pixel may include three sub-pixels each emitting, for example, red light, green light, or blue light. By adjusting the intensity of the red light, the green light, or the blue light emitted by each sub-pixel, the color of light emitted by the pixel may be adjusted.

The substrate 100 may include polymer resins and/or an inorganic insulating material. The polymer resins may include polyethersulfone, polyacrylate, polyetherimide, polyethylene naphthalate, polyethylene terephthalate, polyphenylene sulfide, polyarylate, polyimide, polycarbonate, cellulose acetate propionate, etc. The inorganic insulating material may include $SiO_x$, $SiN_x$, and/or SiON. However, a layer structure of the substrate 100 may be variously changed, and the substrate 100 may have a single-layered structure including glass or metal.

A buffer layer 101 may be disposed on the substrate 100. The buffer layer 101 may prevent or minimize the penetration of impurities, moisture, or external substances from below the substrate 100. The buffer layer 101 may include an inorganic insulating material, such as $SiO_x$, $SiN_x$, and/or SiON, and may have a single-layered structure or a multi-layered structure including at least one selected from the materials described above.

The main organic light-emitting diodes OLEDm may be electrically connected to the pixel circuits PC corresponding thereto, respectively. Each main organic light-emitting diode OLEDm may be electrically connected to the pixel circuit PC between the substrate 100 and the main organic light-emitting diode OLEDm.

The pixel circuit PC may include the thin-film transistor TFT and a capacitor (not shown). In an embodiment, the pixel circuit PC may also be defined as including a plurality of lines (not shown) connected to the thin-film transistor TFT and the capacitor. The thin-film transistor TFT may include an active layer ACT, a gate electrode GE overlapping a channel area of the active layer ACT, a source electrode SE connected to a source area of the active layer ACT, and a drain electrode DE connected to a drain area of the active layer ACT. The source electrode SE and the drain electrode DE may be portions of the lines and may be defined as the portions in contact with the active layer ACT. In an embodiment, where the active layer ACT of the thin-film transistor TFT is directly connected to another active layer ACT of another thin-film transistor TFT, the thin-film transistors TFT may not include the source electrode SE and/or the drain electrode DE.

A gate insulating layer 103 may be disposed between the active layer ACT and the gate electrode GE, and an interlayer insulating layer 105 may be disposed between the gate electrode GE and the source electrode SE and between the gate electrode GE and the drain electrode DE. A first via layer 107 and a second via layer 109 may be sequentially disposed on the source electrode SE and the drain electrode DE.

The active layer ACT may include polysilicon. According to some embodiments, the active layer ACT may include amorphous silicon. According to some embodiments, the active layer ACT may include an oxide semiconductor of at least one material selected from In, Ga, Sn, Zr, V, Hf, Cd, Ge, Cr, Ti, and Zn. The active layer ACT may include a channel area, and a source area and a drain area doped with impurities.

The gate electrode GE may include a low-resistance conductive material, such as Mo, Al, Cu, and/or Ti, and may have a single-layered structure or a multi-layered structure including at least one selected from the materials described above.

The source electrode SE and/or the drain electrode DE may include Al, Pt, Pd, Ag, Mg, Au, Ni, Nd, Ir, Cr, Ca, Mo, Ti, W, and/or Cu and may have a single-layered structure or a multi-layered structure including at least one selected from the materials described above.

The gate insulating layer 103 and/or the interlayer insulating layer 105 may include an inorganic insulating material such as $SiO_x$, $SiN_x$, and/or SiON and may have a single-layered structure or a multi-layered structure including at least one selected from the materials described above.

The first via layer 107 and the second via layer 109 may be disposed on the interlayer insulating layer 105. The first via layer 107 and the second via layer 109 may include an organic material, such as acryl, benzocyclobutene (BCB), polyimide (PI), or hexamethyldisiloxane (HMDSO). The first via layer 107 and the second via layer 109 may function as protection layers covering the thin-film transistor TFT, and an upper portion of each of the first via layer 107 and the second via layer 109 may be flat. In another embodiment, the display panel 10 may include a single via layer or three or more via layers.

A connection electrode CM may be disposed between the first via layer 107 and the second via layer 109. Through the connection electrode CM, the thin-film transistor TFT may be electrically connected to a first electrode 210 of the organic light-emitting diode corresponding to the thin-film transistor TFT. The connection electrode CM may be connected to the thin-film transistor TFT through a contact hole of the first via layer 107, and the first electrode 210 may be connected to the connection electrode CM through a contact hole of the second via layer 109.

Each main organic light-emitting diode OLEDm may include an overlapping structure of the first electrode 210, which is a sub-pixel electrode, an intermediate layer 220, and a second electrode 230, which is an opposite electrode. The overlapping structure may include various functional layers. The first electrodes 210 of the main organic light-emitting diodes OLEDs may be arranged to be apart from each other.

The first electrode 210 may be disposed above the second via layer 109. The first electrode 210 may include a reflective layer including Ag, Mg, Al, Pt, Pd, Au, Ni, Nd, Ir, Cr, or a compound thereof. The first electrode 210 may include the reflective layer including the materials described above and a transparent conductive layer disposed above or/and below the reflective layer. The transparent conductive layer may include indium tin oxide (ITO), indium zinc oxide (IZO), zinc oxide (ZnO), indium oxide ($In_2O_3$), indium gallium oxide (IGO), or aluminum zinc oxide (AZO).

A bank layer 111 covering an edge of the first electrode 210 may be provided with an opening overlapping a central portion of the first electrode 210. The opening of the bank layer 111 may define an emission area of the main organic light-emitting diode OLEDm. In an embodiment, for example, a width of the opening of the bank layer 111 may correspond to a width of the emission area of the main organic light-emitting diode OLEDm.

The bank layer 111 may include a light-blocking insulating material. Accordingly, the bank layer 111 may include a colored non-transparent light-blocking insulating layer and for example, may be seen as black. In an embodiment, for example, the bank layer 111 may include a PI-based binder and a pigment in which red, green, and blue colors are combined. Alternatively, the bank layer 111 may include cardo-based binder resin and a mixture of a lactam-based black pigment and a blue pigment. Alternatively, the bank layer 111 may include carbon black. The bank layer 111 may prevent the penetration of external light along with the reflection prevention layer 500 to be described below and may increase contrast of the display panel 10.

The intermediate layer 220 may be arranged to correspond to the opening of each bank layer 111 and may overlap the first electrode 210. The intermediate layer 220 may include an emission layer including a high-molecular weight organic material or a low-molecular weight organic material emitting light of a certain color corresponding to each sub-pixel. The intermediate layer 220 may include functional layers disposed below and/or above the emission layer.

According to an embodiment, the functional layers may include a hole transport layer (HTL) and/or a hole injection layer (HIL). According to an embodiment, the functional layers may include an electron transport layer (ETL) and/or an electron injection layer (EIL). According to an embodiment, the functional layers may be integrally or commonly formed throughout the plurality of pixels.

The second electrode 230 may cover the intermediate layer 220 and the bank layer 111. According to an embodiment, the second electrode 230 may be integrally or commonly formed throughout the plurality of pixels.

A capping layer 240 may be disposed on the main organic light-emitting diode OLEDm. According to an embodiment, the capping layer 240 may cover the second electrode 230. According to an embodiment, the capping layer 240 may increase the emission efficiency of the main organic light-emitting diode OLEDm based on the constructive interference principle.

The capping layer 240 may include an organic capping layer including an organic material, an inorganic capping layer including an inorganic material, or a complex capping layer including an organic material and an inorganic material. In an embodiment, for example, the capping layer 240 may include a carbocyclic compound, a heterocyclic compound, an amine-group containing compound, porphin derivatives, phthalocyanine derivatives, naphthalocyanine derivatives, an alkali metal complex, an alkali earth-metal complex, or an arbitrary combination thereof.

The thin-film encapsulation layer 300 may cover the main organic light-emitting diode OLEDm. According to an embodiment, the thin-film encapsulation layer 300 may be disposed on the capping layer 240. The thin-film encapsulation layer 300 may include a first inorganic encapsulation layer 310, a second inorganic encapsulation layer 330, and an organic encapsulation layer 320 therebetween.

Each of the first inorganic encapsulation layer 310 and the second inorganic encapsulation layer 330 may include an inorganic insulating material. The inorganic insulating material may include $SiO_2$, $SiN_x$, $SiO_xN_y$, $Al_2O_3$, $TiO_2$, $Ta_2O_5$, $HfO_2$, or $ZnO_x$.

The organic encapsulation layer 320 may include a polymer-based material. The polymer-based material may include acryl-based resins, epoxy-based resins, polyimide, and/or polyethylene. In an embodiment, the organic encapsulation layer 320 may include acryl-based resins, for example, polymethylmethacrylate and/or polyacrylic acid. The organic encapsulation layer 320 may be formed by curing a monomer or by being coated with a polymer.

The touch layer 400 may include touch electrodes, and the touch electrodes may include a mesh structure at least partially surrounding the emission area of each organic light-emitting diode in a plan view.

The touch layer 400 may include a first touch electrode layer 410 on the thin-film encapsulation layer 300, a first touch insulating layer 420 on the first touch electrode layer 410, a second touch electrode layer 430 on the first touch insulating layer 420, and a second touch insulating layer 440 on the second touch electrode layer 430. The first touch electrode layer 410 and the second touch electrode layer 430 may be connected to each other through a contact hole defined or formed in the first touch insulating layer 420. According to an embodiment, the first touch electrode layer 410 may be disposed on the second inorganic encapsulation layer 330, as illustrated in FIG. 3. According to another embodiment, an additional touch insulating layer may be disposed between the first touch electrode layer 410 and the second inorganic encapsulation layer 330.

The first touch insulating layer 420 and the second touch insulating layer 440 may include an inorganic insulating material and/or an organic insulating material.

The reflection prevention layer 500 may include a light-blocking layer 510 and color filters 520. The light-blocking layer 510 may include a mesh structure surrounding an emission area of each main organic light-emitting diode OLEDm, in a plan view or when viewed in the z direction. The light-blocking layer 510 may include a light-blocking material and may be seen as a non-transparent color, for example, black. According to an embodiment, the light-blocking layer 510 may include a black matrix. The light-blocking layer 510 may prevent the reflection of external light. Also, the light-blocking layer 510 may cover the touch electrode layer disposed therebelow, for example, the second touch electrode layer 430, so that the second touch electrode layer 430 is not visible to a user. The color filters 520 may be arranged in openings of the light-blocking layers 510 respectively corresponding to the main organic light-emitting diodes OLEDm. The color filter 520 may transmit light of a same color as the light emitted from the main organic light-emitting diode OLEDm corresponding to the color filter 520. Through the light-blocking layer 510 and the color filters 520, the reflection prevention layer 500 may improve the contrast of the display panel 10, furthermore, of the display apparatus. An overcoat layer 530 may be disposed on the light-blocking layer 510 and the color filters 520. The overcoat layer 530 may entirely cover the light-blocking layer 510 and the color filters 520.

Figure 4:
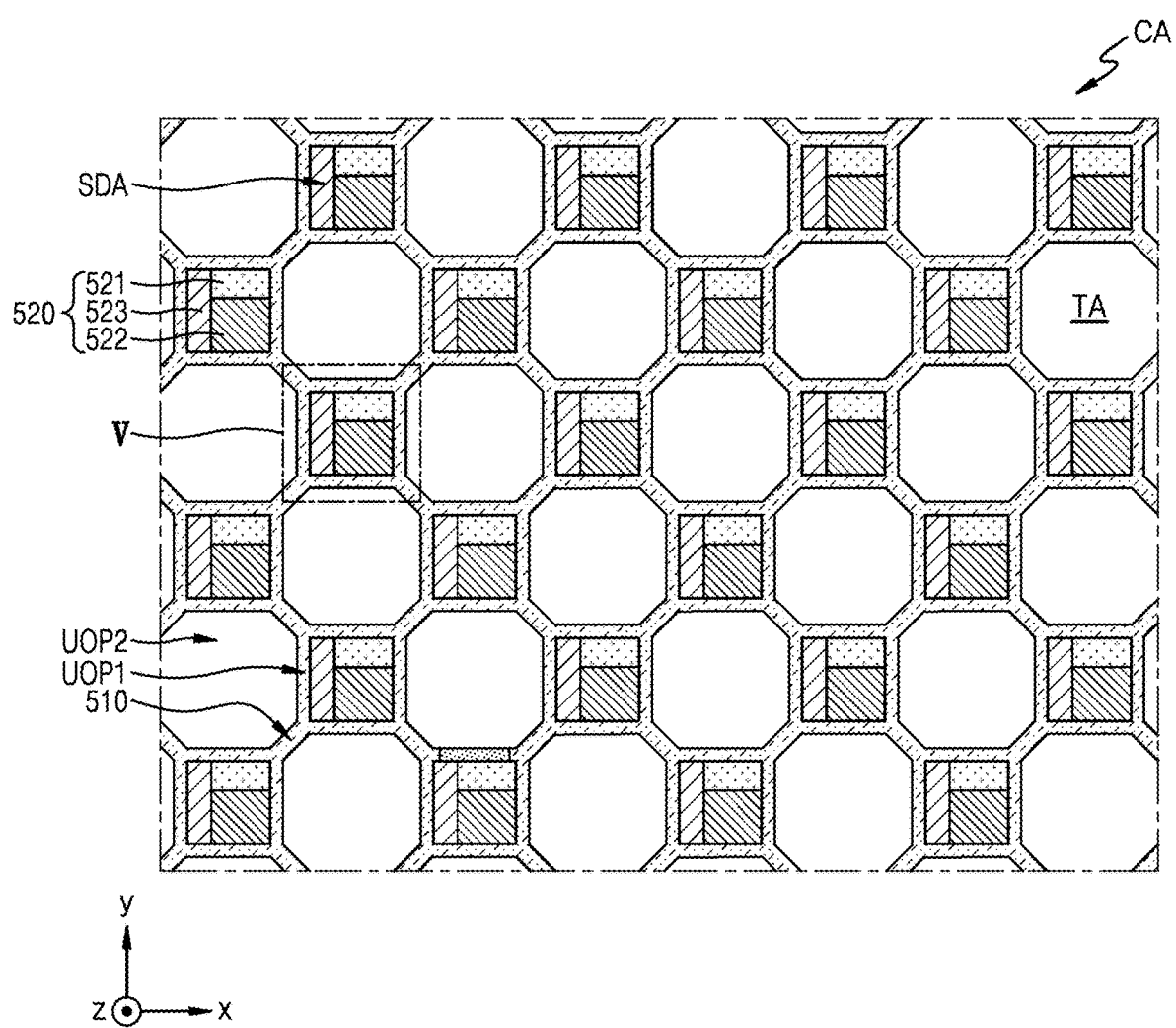
FIG. 4 is a plan view of a component area of a display apparatus according to an embodiment.
Figure 5:
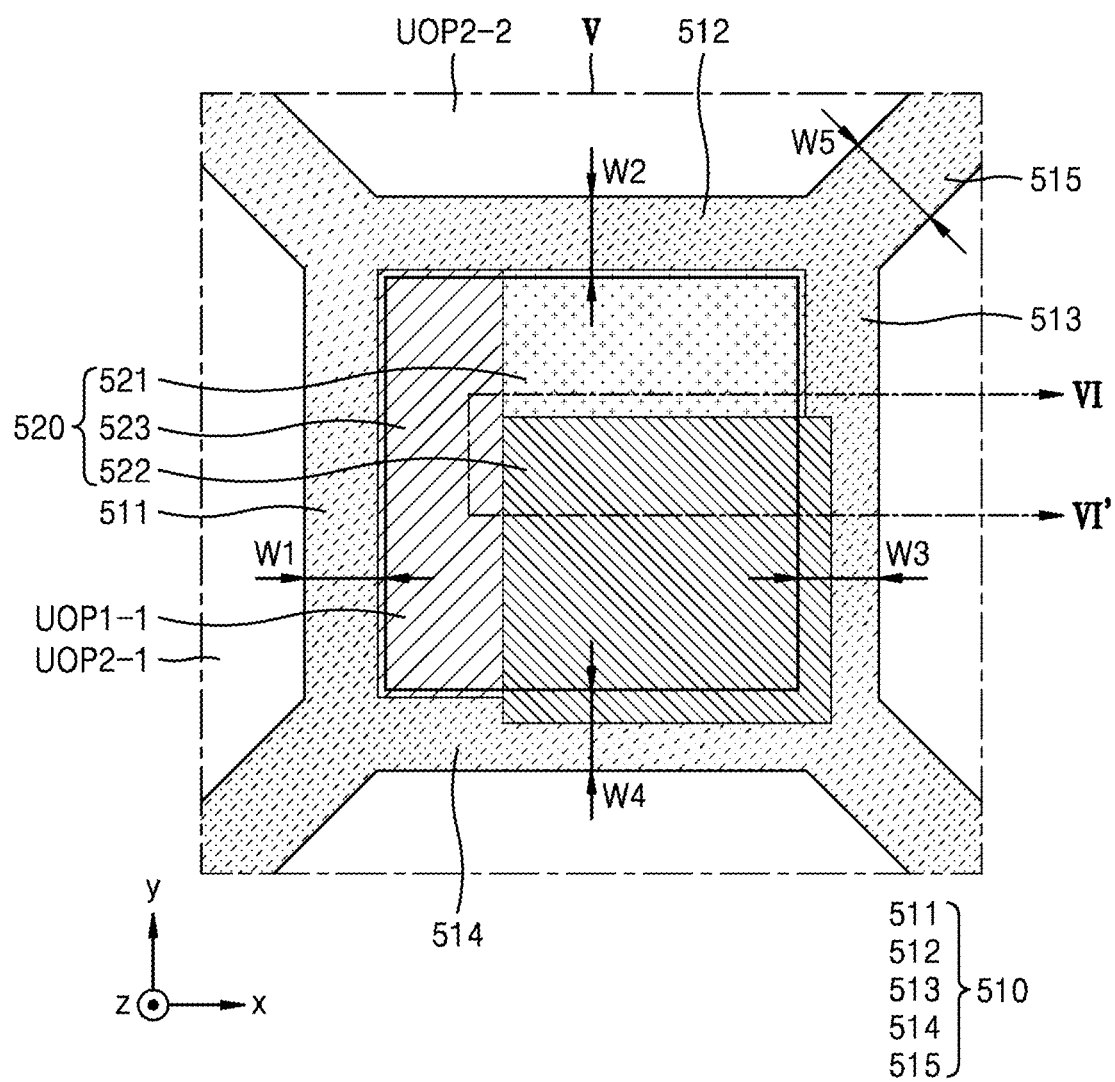
FIG. 5 is an enlarged plan view of region V of the display apparatus of FIG. 4.

FIG. 4 is a plan view of a component area CA of a display apparatus according to an embodiment. FIG. 5 is an enlarged plan view of region V of the display apparatus of FIG. 4.

Referring to FIGS. 4 and 5, in an embodiment of a display apparatus, the component area CA may include a plurality of transmission areas TA and a plurality of sub-display areas SDA. The plurality of transmission areas TA and the plurality of sub-display areas SDA may be alternately arranged in a direction (for example, an x direction or a y direction). In such an embodiment, the plurality of transmission areas TA and the plurality of sub-display areas SDA may be arranged in a grid shape. Accordingly, one sub-display area SDA may be adjacent to a plurality of transmission areas TA. In the accompanying drawings, embodiments where the transmission area TA has an approximately octagonal shape and the sub-display area SDA has an approximately quadrangular shape are illustrated for convenience of illustration and description. However, the disclosure is not necessarily limited thereto.

The light-blocking layer 510 may have a mesh shape in the component area CA. In an embodiment, for example, the light-blocking layer 510 may define a first upper opening UOP1 overlapping the sub-display area SDA and a second upper opening UOP2 overlapping the transmission area TA. In an embodiment, each of the first upper opening UOP1 and the second upper opening UOP2 may be defined in the light-blocking layer 510 in plural.

A portion of the light-blocking layer 510, which is arranged between a first upper opening UOP1 and a second upper opening UOP2 adjacent to each other, may be referred to as a light-blocking portion. Accordingly, the light-blocking portion of the light-blocking layer 510 may at least partially surround the transmission area TA and the sub-display area SDA. In an embodiment, for example, a portion of the light-blocking layer 510 may extend in an x direction and/or a y direction and may surround portions of the sub-display area SDA and the transmission area TA. Also, another portion of the light-blocking layer 510 may extend in directions diagonal to the x direction and the y direction and may surround a portion of the transmission area TA.

The color filters 520 may be disposed on the light-blocking layer 510 to correspond to the sub-display area SDA. According to an embodiment, the color filters 520 may include first to third color filters 521, 522, and 523. Each of the first to third color filters 521, 522, and 523 may transmit light of a different color.

The light-blocking layer 510 may include a first first upper opening (hereinafter, will be referred to as "1st-1 upper opening") UOP1-1, a first second upper opening (hereinafter, will be referred to as "2nd-1 upper opening") UOP2-1, a second second upper opening (hereinafter, will be referred to as "2nd-2 upper opening") UOP2-2, and first to fifth light-blocking portions 511, 512, 513, 514, and 515. The 1st-1 upper opening UOP1-1 may be one of the first upper openings UOP1 described above and may overlap a sub-display area SDA. The 2nd-1 upper opening UOP2-1 may be one of the second upper openings UOP2 described above and may overlap a transmission area TA adjacent to the sub-display area SDA. The 2nd-2 upper opening UOP2-2 may be one of the second upper openings UOP2 described above and may overlap another transmission area TA adjacent to the sub-display area SDA. According to an embodiment, the 2nd-1 upper opening UOP2-1 may be arranged in a −x direction with respect to the 1st-1 upper opening UOP1-1, and the 2nd-2 upper opening UOP2-2 may be arranged in a +y direction with respect to the 1st-1 upper opening UOP1-1.

The first to fifth light-blocking portions 511 to 515 may be arranged between adjacent first upper openings UOP1 and/or between adjacent second upper openings UOP2. Alternatively, the first to fifth light-blocking portions 511 to 515 may define the first upper openings UOP1 and/or the second upper openings UOP2. The first light-blocking portion 511 may be arranged at a −x side with respect to the 1st-1 upper opening UOP1-1, for example, between the 1st-1 upper opening UOP1-1 and the 2nd-1 upper opening UOP2-1. The second light-blocking portion 512 may be arranged at a +y side with respect to the 1st-1 upper opening UOP1-1, for example, between the 1st-1 upper opening UOP1-1 and the 2nd-2 upper opening UOP2-2. The third light-blocking portion 513 may be arranged at a +x side with respect to the 1st-1 upper opening UOP1-1 in substantially the same way as the first light-blocking portion 511. The fourth light-blocking portion 514 may be arranged at a −y direction with respect to the 1st-1 upper opening UOP1-1 in substantially the same way as the second light-blocking portion 512. The fifth light-blocking portion 515 may be arranged between adjacent second upper openings UOP2. In an embodiment, for example, a portion of the fifth light-blocking portion 515 may be arranged between the 2nd-1 upper opening UOP2-1 and the 2nd-2 upper opening UOP2-2.

Widths of the first to fifth light-blocking portions 511 to 515 may be different from each other. According to an embodiment, a width W1 of the first light-blocking portion 511 may be less than a width W3 of the third light-blocking portion 513. According to an embodiment, the width W1 of the first light-blocking portion 511, a width W2 of the second light-blocking portion 512, and a width W4 of the fourth light-blocking portion 514 may be less than the width W3 of the third light-blocking portion 513. According to an embodiment, the width W1 of the first light-blocking portion 511 may be greater than the width W2 of the second light-blocking portion 512 and the width W4 of the fourth light-blocking portion 514. According to an embodiment, the width W2 of the second light-blocking portion 512 may be the same as the width W4 of the fourth light-blocking portion 514. According to an embodiment, the width W1 of the first light-blocking portion 511 may be less than a width W5 of the fifth light-blocking portion 515.

The color filter 520 may be arranged to overlap the 1st-1 upper opening UOP1-1 of the light-blocking layer 510. The color filter 520 may include first to third color filters 521, 522, and 523, each of which transmits light of a different color. According to an embodiment, the first color filter 521 may transmit red light, the second color filter 522 may transmit green light, and the third color filter 523 may transmit blue light. According to an embodiment, in a plan view, shapes and areas of the first to third color filters 521 to 523 may be different from each other. According to an embodiment, each of the first to third color filters 521 to 523 may partially overlap the light-blocking portion of the light-blocking layer 510 and may have a different overlapping area from another. However, the disclosure is not limited to the color filters having the number and the arrangement illustrated in FIG. 5. Numbers, shapes, and/or areas of the color filters 520 may be variously changed.

Figure 6:
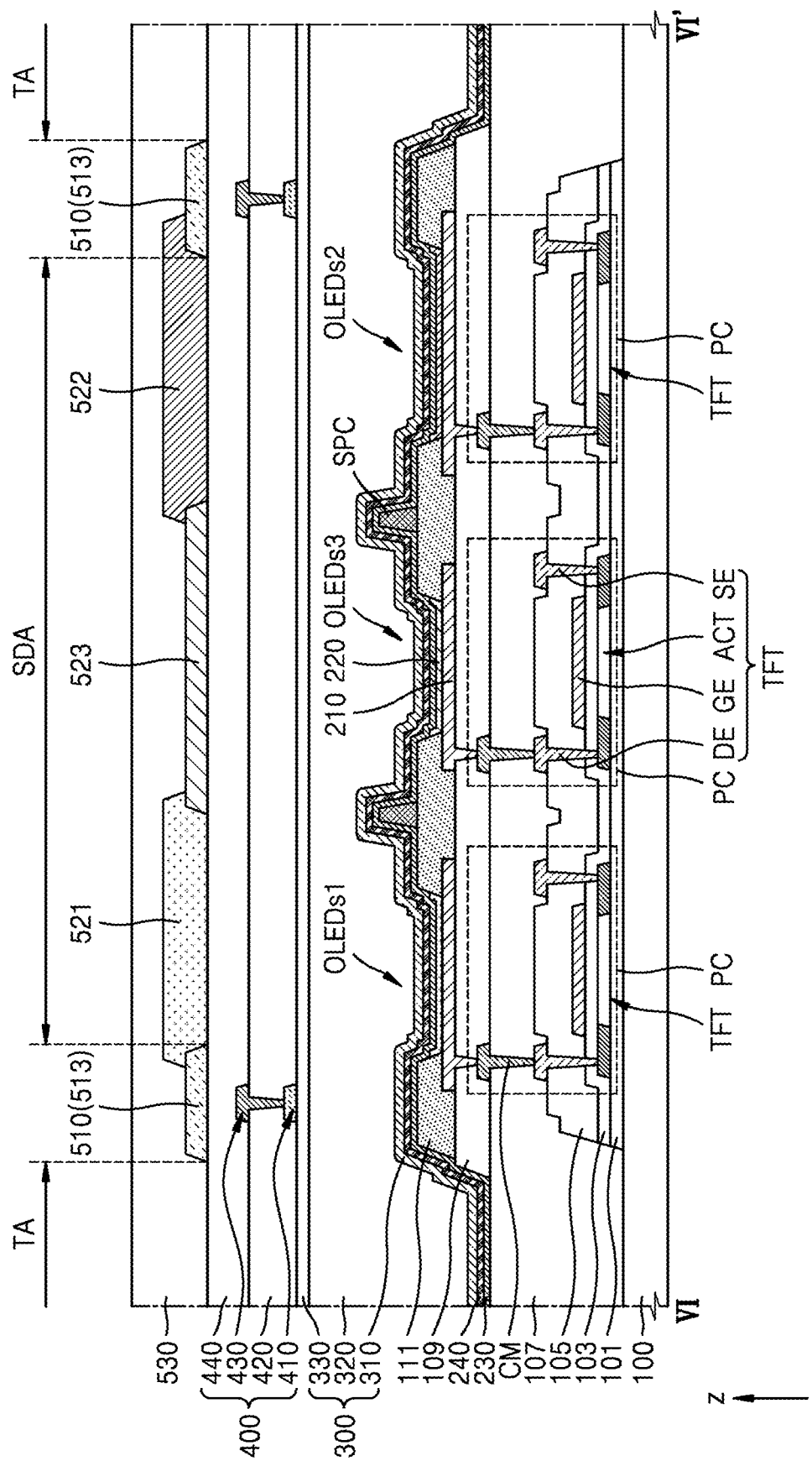
FIG. 6 is a cross-sectional view of the display apparatus of FIG. 5, taken along line VI-VI'.

FIG. 6 is a cross-sectional view of the display apparatus of FIG. 5, taken along line VI-VI'.

Referring to FIG. 6, first to third sub-organic light-emitting diodes OLEDs1, OLEDs2, and OLEDs3 may be arranged in the sub-display area SDA. The characteristics and the operating principle of each of the first to third sub-organic light-emitting diodes OLEDs1, OLEDs2, and OLEDs3 may be the same as the characteristics and the operating principle of the main organic light-emitting diode OLEDm (FIG. 3) described above with reference to FIG. 3.

A spacer SPC may be arranged between the first sub-organic light-emitting diode OLEDs1 and the second sub-organic light-emitting diode OLEDs2. The spacer SPC may be arranged between the second sub-organic light-emitting diode OLEDs2 and the third sub-organic light-emitting diode OLEDs3. The spacer SPC may define areas between the sub-organic light-emitting diodes such that a deposition material deposited in each sub-organic light-emitting diode does not spill over to an adjacent sub-organic light-emitting diode during a deposition process.

The light-blocking layer 510 may not be arranged in the sub-display area SDA. Accordingly, unlike in the main display area MDA (FIG. 3), in the sub-display area SDA, the first to third color filters 521 to 523 may be directly disposed on an upper surface of the touch layer 400. In an embodiment, for example, the third color filter 523 may overlap the third sub-organic light-emitting diode OLEDs3 and may be disposed on an upper surface of the second touch insulating layer 440. The first color filter 521 may overlap the first sub-organic light-emitting diode OLEDs1 and may be disposed on the second touch insulating layer 440. Here, the first color filter 521 may cover a portion of an edge of the third color filter 523 and a portion of an edge of the light-blocking layer 510 (for example, the third light-blocking portion 513). The second color filter 522 may overlap the second sub-organic light-emitting diode OLEDs2 and may be disposed on the second touch insulating layer 440. Here, the second color filter 522 may cover a portion of an edge of the third color filter 523 and a portion of an edge of the light-blocking layer 510 (for example, the third light-blocking portion 513). Also, each of the first and second color filters 521 and 522 may be in direct contact with the upper surface of the second touch insulating layer 440.

Some layers may be omitted in the transmission area TA. In an embodiment, for example, the buffer layer 101, the gate insulating layer 103, the interlayer insulating layer 105, the second via layer 109, the bank layer 111, the light-blocking layer 510, and the color filter 520 may be omitted in the transmission area TA. In other words, the buffer layer 101, the gate insulating layer 103, the interlayer insulating layer 105, the second via layer 109, and the bank layer 111 may collectively define an opening overlapping the transmission area TA.

The first via layer 107 and the organic encapsulation layer 320 may be arranged throughout the sub-display area SDA and the transmission area TA and may have flat upper surfaces. The first via layer 107 may be in direct contact with an upper surface of the substrate 100 in the transmission area TA. The second electrode 230 may be in direct contact with an upper surface of the first via layer 107 in the transmission area TA. The overcoat layer 530 covering the light-blocking layer 510 and the color filter 520 may be in direct contact with the upper surface of the second touch insulating layer 440 in the transmission area TA.

Figure 7A:
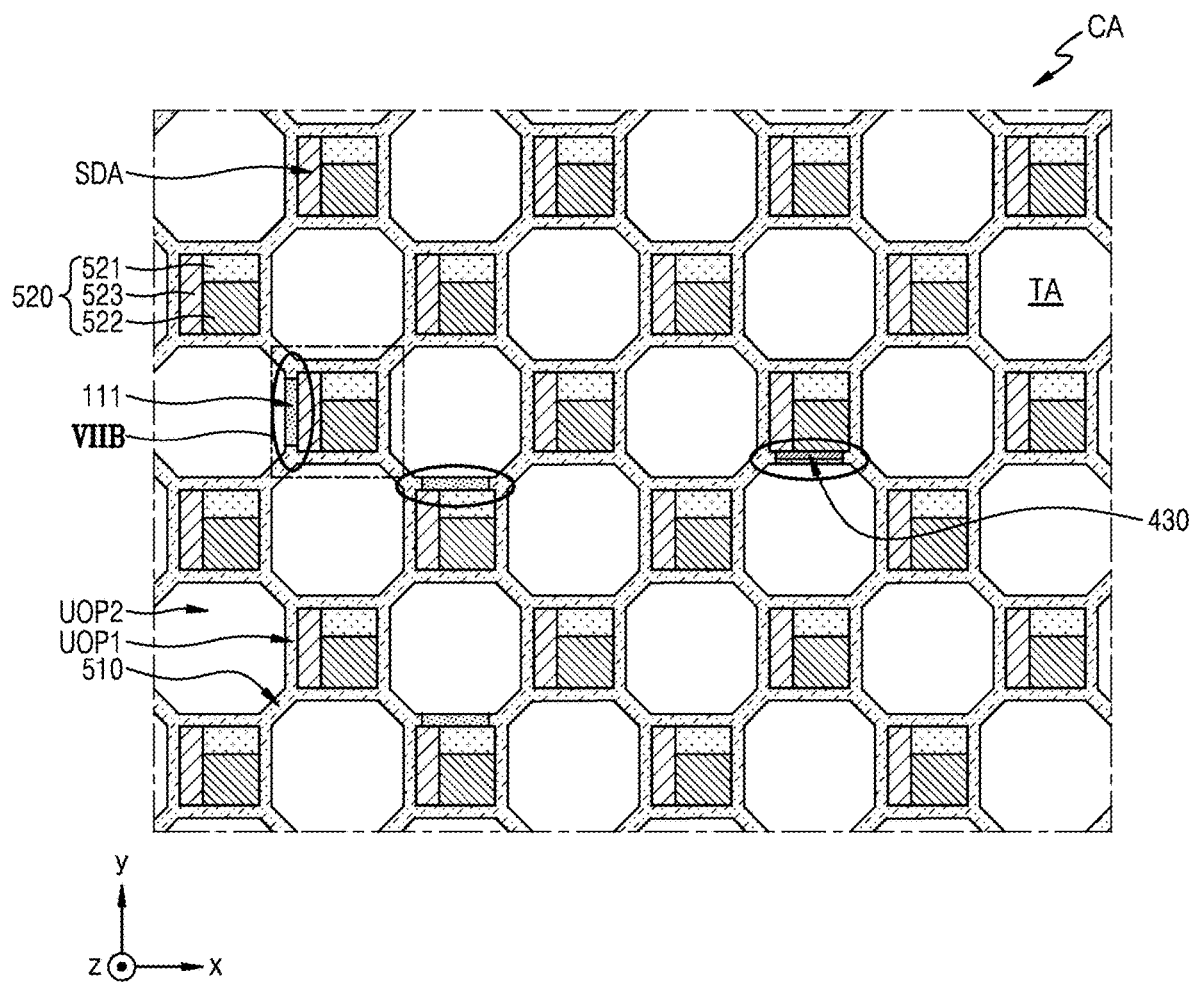
FIG. 7A is a plan view of a component area of a display apparatus according to another embodiment.
Figure 7B:
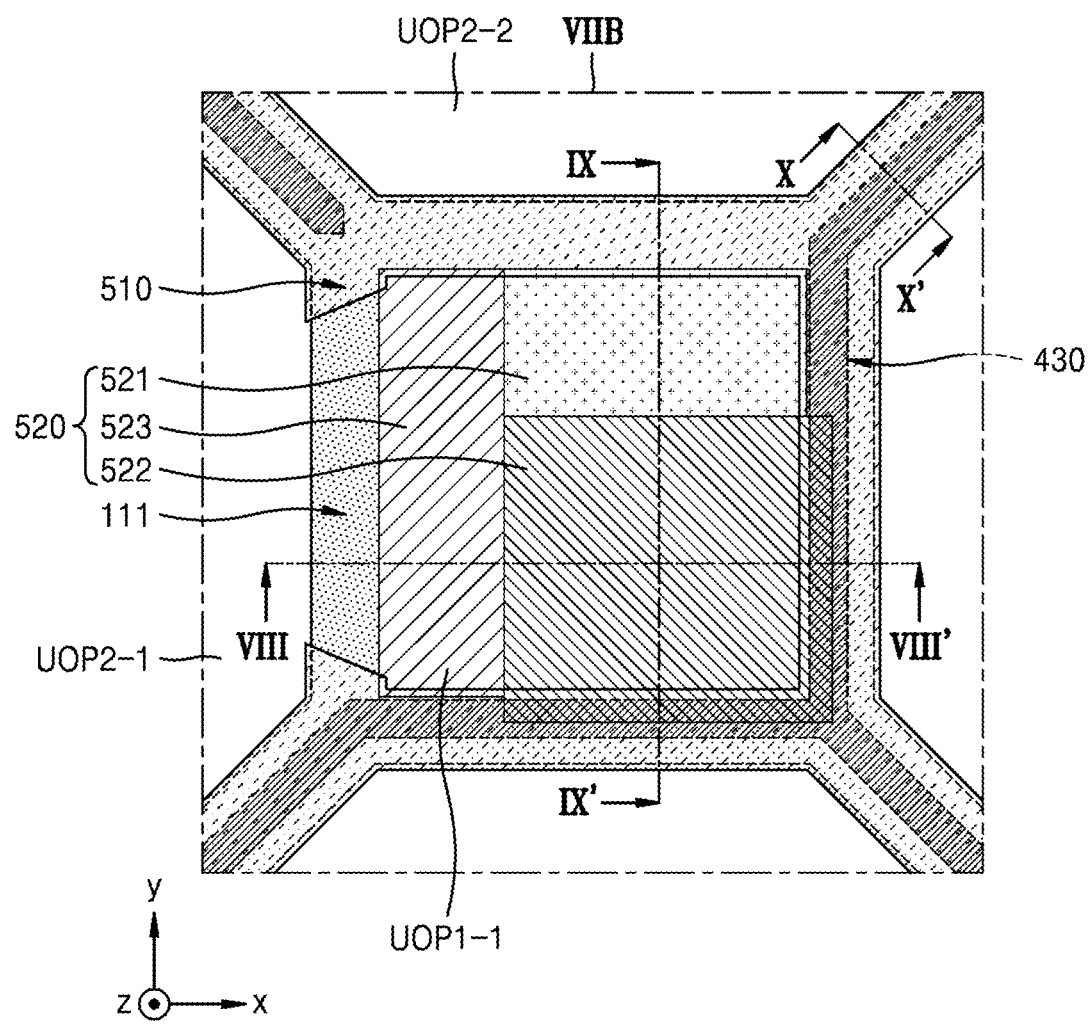
FIG. 7B is an enlarged plan view of region VIIB of the display apparatus of FIG. 7A.

FIG. 7A is a plan view of a component area of a display apparatus according to another embodiment. FIG. 7B is an enlarged plan view of region VIIB of the display apparatus of FIG. 7A.

Referring to FIGS. 7A and 7B, in an embodiment, a portion of a mesh structure of the light-blocking layer 510 may be omitted. In an embodiment, for example, a portion of the light-blocking layer 510 arranged between the sub-display area SDA and the transmission area TA may be omitted. Accordingly, a portion of the second touch electrode layer 430 and/or a portion of the bank layer 111, disposed below the light-blocking layer 510, may be exposed and/or seen.

In an embodiment, referring to FIG. 7B, in an area in which the light-blocking layer 510 is omitted, the second touch electrode layer 430 may also be omitted and thus may not be seen. For example, referring to FIGS. 5 and 7B together, according to an embodiment illustrated in FIG. 7B, the first blocking portion 511 shown in FIG. 5 may be omitted. Accordingly, the 1st-1 upper opening UOP1-1 and the 2nd-1 upper opening UOP2-1 may be spatially connected to each other. Here, the second touch electrode layer 430 may be omitted where the second touch electrode layer 430 overlaps the first light-blocking portion 511 and the second light-blocking portion 512. In other words, the second touch electrode layer 430 may not be arranged in a −x direction and a +y direction with respect to the 1st-1 upper opening UOP1-1. The bank layer 111 may be disposed to overlap the light-blocking layer 510. Thus, in such an embodiment where a portion of the light-blocking layer 510 is omitted, the second touch electrode layer 430 may also be omitted in the corresponding area and the bank layer 111 disposed therebelow may be seen.

Both of the light-blocking layer 510 and the bank layer 111 may include a light-absorptive material and may thus be black and may not reflect external light. However, the second touch electrode layer 430 may include metal and may thus reflect external light. Thus, in a case where a portion of the light-blocking layer 510 is omitted, the second touch electrode layer 430 may reflect external light and may glitter in the corresponding area to be visible to a user. However, according to an embodiment of the disclosure, where a portion of the light-blocking layer 510 is omitted, a portion of the second touch electrode layer 430 corresponding to (or exposed by) the omitted portion of the light-blocking layer 510 such that the second touch electrode layer 430 may not be seen and only the bank layer 111 may be seen, and thus, reflection of external light may not occur in the corresponding area, and the second touch electrode layer 430 may not be seen by a user.

However, the disclosure is not necessarily limited to the structure in which both of the light-blocking layer 510 and the second touch electrode layer 430 are omitted in a certain area. For example, referring to FIG. 7B again, while the second touch electrode layer 430 may be omitted, the light-blocking layer 510 may not be omitted, in an area between the 1st-1 upper opening UOP1-1 and the 2nd-2 upper opening UOP2-2. Alternatively, as illustrated in FIG. 7A, while the light-blocking layer 510 may be omitted, the second touch electrode layer 430 may not be omitted and may be seen, in some areas.

Figure 8:
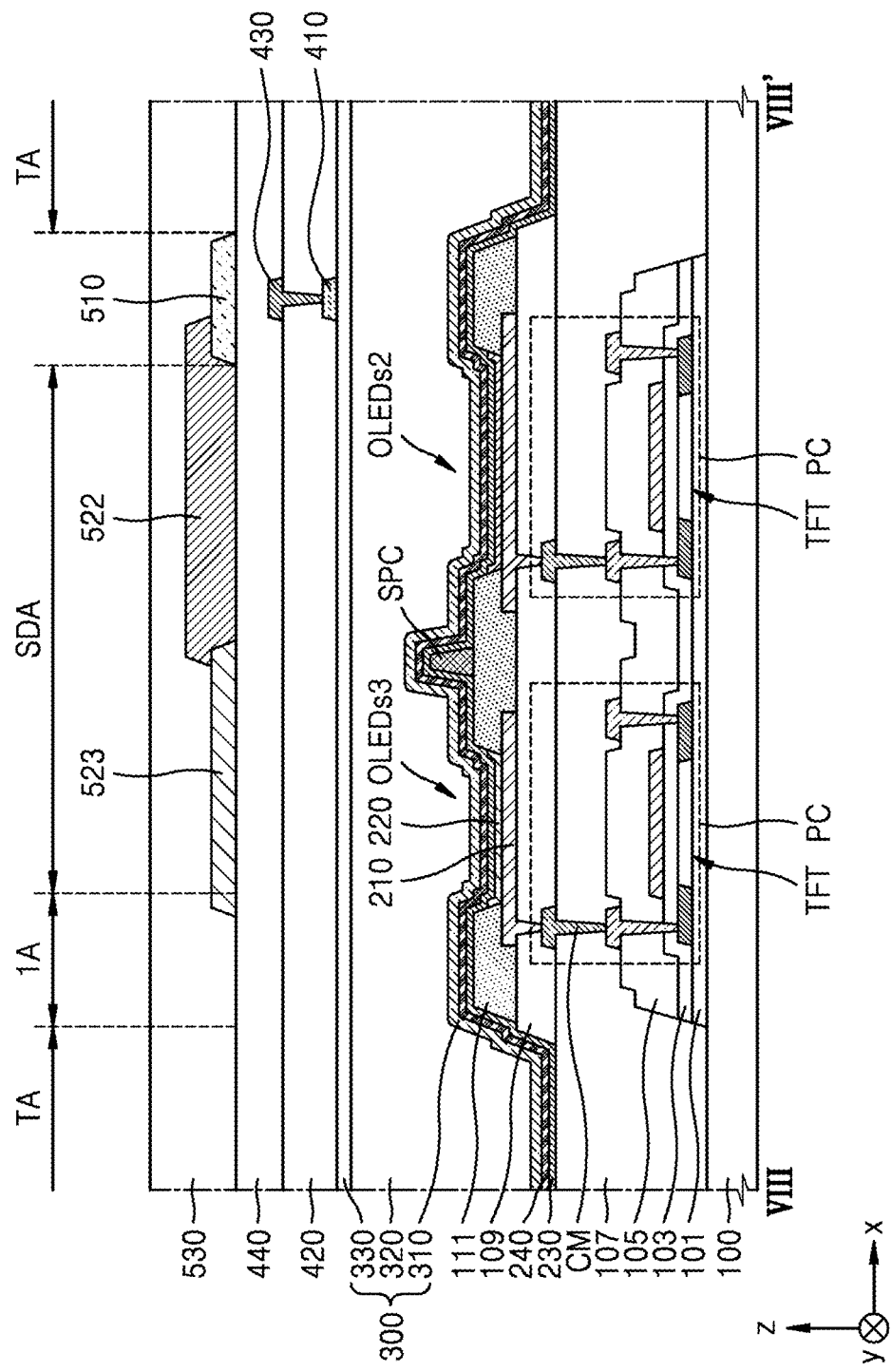
FIG. 8 is a cross-sectional view of the display apparatus of FIG. 7B, taken along line VIII-VIII'.
Figure 9:
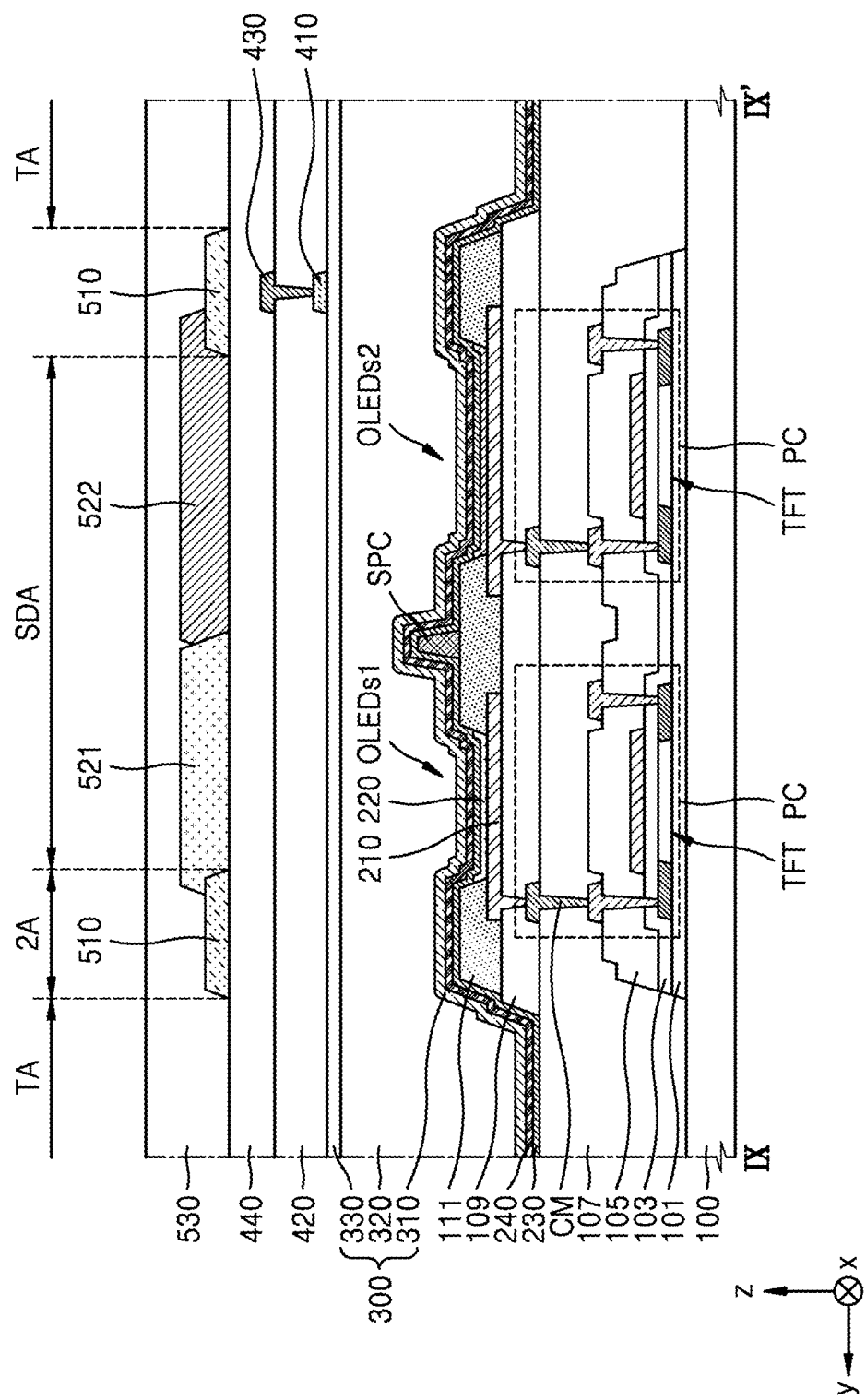
FIG. 9 is a cross-sectional view of the display apparatus of FIG. 7B, taken along line IX-IX'.
Figure 10:
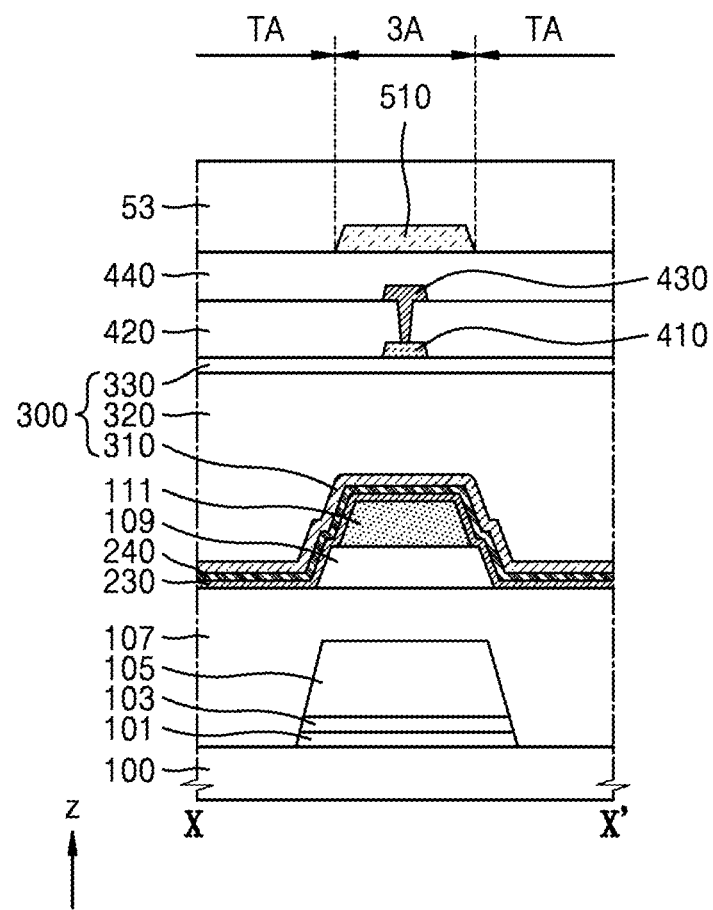
FIG. 10 is a cross-sectional view of the display apparatus of FIG. 7B, taken along line X-X'.

FIG. 8 is a cross-sectional view of the display apparatus of FIG. 7B, taken along line VIII-VIII'. FIG. 9 is a cross-sectional view of the display apparatus of FIG. 7B, taken along line IX-IX'. FIG. 10 is a cross-sectional view of the display apparatus of FIG. 7B, taken along line X-X'.

According to the characteristics of a plan view, the second touch electrode layer 430 viewed in a +z direction is mainly described above with reference to FIGS. 7A and 7B. The characteristics of the second touch electrode layer 430 described with reference to FIGS. 7A and 7B may be likewise applied to the first touch electrode layer 410 hereinafter.

Referring to FIG. 8, the light-blocking layer 510 may not be arranged in some areas, for example, a first area 1A between the transmission area TA and the sub-display area SDA at a −x side. Similarly, the second touch electrode layer 430 and the first touch electrode layer 410 may not be arranged in the first area 1A. Accordingly, the second touch insulating layer 440 and the first touch insulating layer 420 may be in direct contact with each other in the first area 1A. In an embodiment, for example, an upper surface of the first touch insulating layer 420 and a lower surface of the second touch insulating layer 440 may be in direct contact with each other. Also, the overcoat layer 530 may be in direct contact with the second touch insulating layer 440 in the first area 1A. In an embodiment, for example, a lower surface of the overcoat layer 530 may be in direct contact with an upper surface of the second touch insulating layer 440. However, the bank layer 111 may be arranged in the first area 1A. Thus, when the first area 1A is viewed in a +z direction, the bank layer 111 may be seen, as illustrated in FIG. 7B.

Referring to FIG. 9, the second touch electrode layer 430 and the first touch electrode layer 410 may be omitted in some areas, for example, a second area 2A between the transmission area TA and the sub-display area SDA at a +y side. However, the light-blocking layer 510 may be arranged in the second area 2A. Accordingly, a lower surface of the second touch insulating layer 440 and an upper surface of the first touch insulating layer 420 may be in direct contact with each other in the second area 2A. However, in the second area 2A, a lower surface of the overcoat layer 530 and an upper surface of the second touch insulating layer 440 may be spaced apart from each other by the light-blocking layer 510. When the second area 2A is viewed in the +z direction, the light-blocking layer 510 may be seen, which is as illustrated in FIG. 7B.

Referring to FIG. 10, all of the light-blocking layer 510, the second touch electrode layer 430, the first touch electrode layer 410, and the bank layer 111 may be arranged in the third area 3A between the transmission areas TA. When the third area 3A is viewed in the +z direction, the light-blocking layer 510 may be seen, as illustrated in FIG. 7B.

Figure 11A:
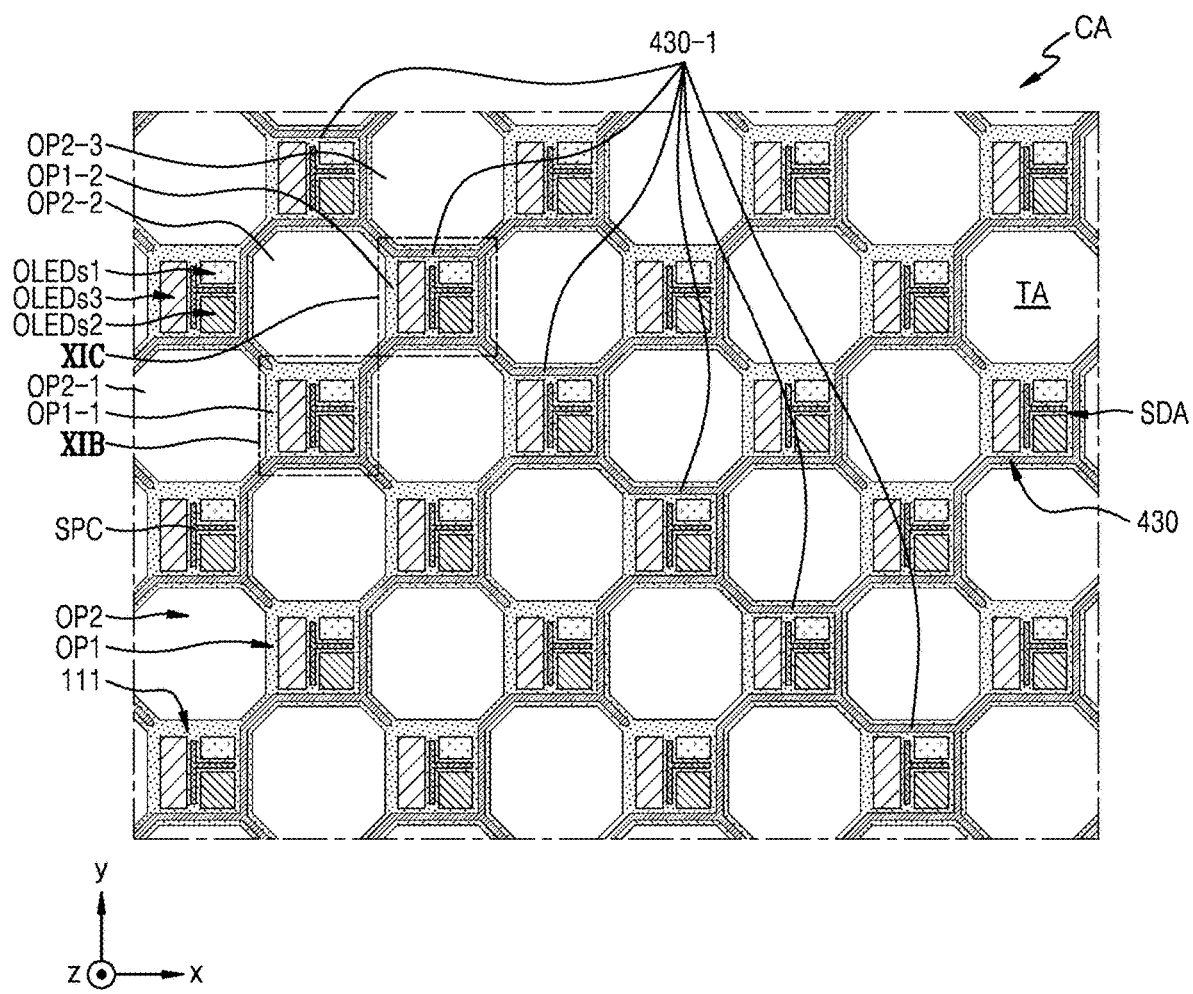
FIG. 11A is a plan view of a component area of a display apparatus according to an embodiment.
Figure 11B:
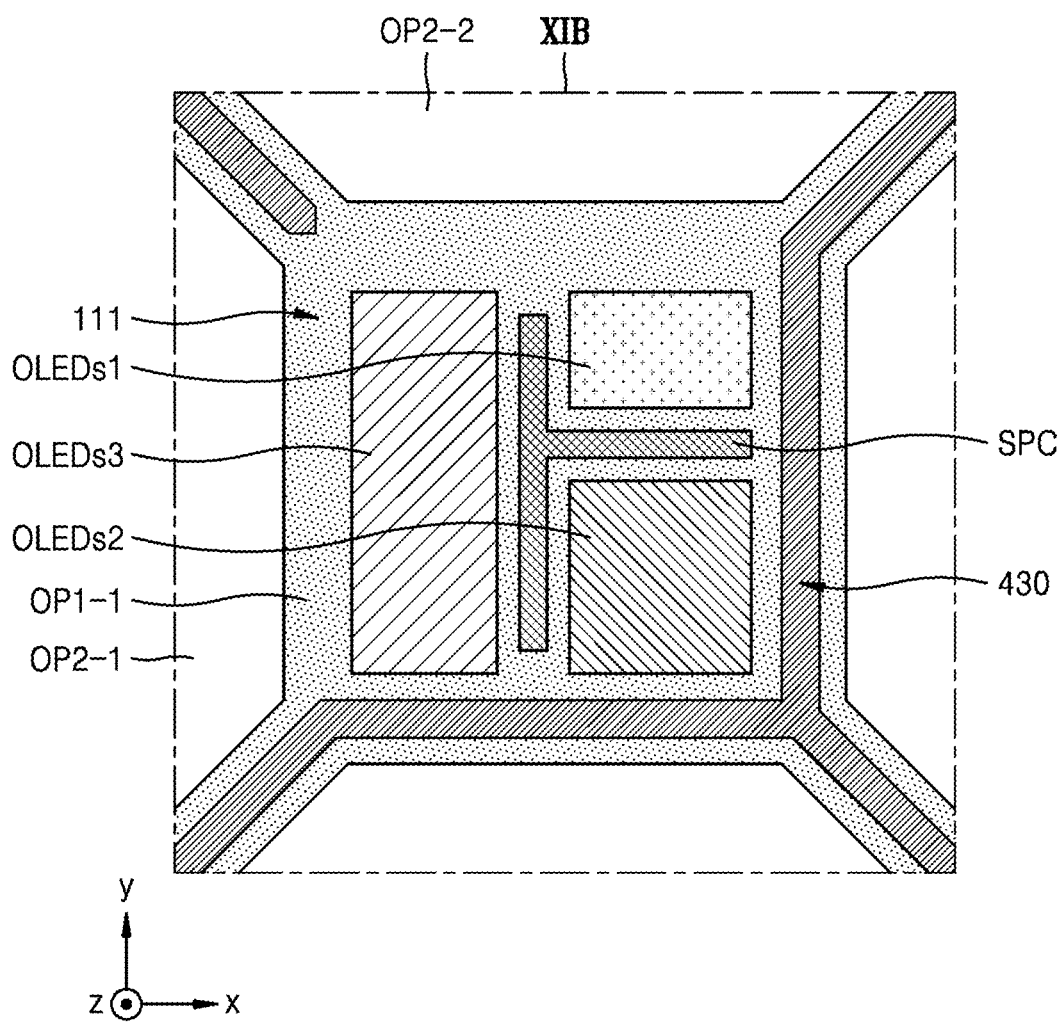
FIG. 11B is an enlarged plan view of region XIB of the display apparatus of FIG. 11A.
Figure 11C:
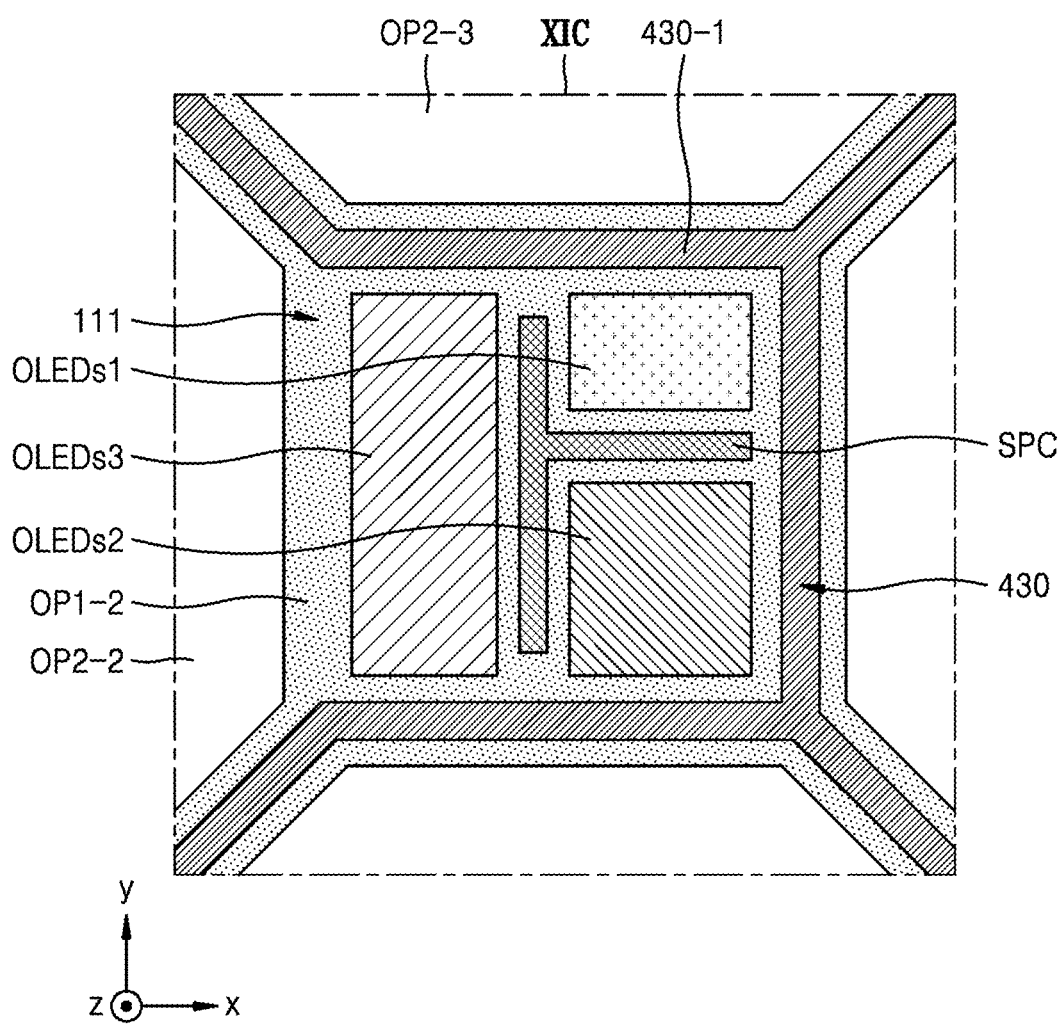
FIG. 11C is an enlarged plan view of region XIC of the display apparatus of FIG. 11A.

FIG. 11A is a plan view of a component area of a display apparatus according to an embodiment. FIG. 11B is an enlarged plan view of region XIB of the display apparatus of FIG. 11A. FIG. 11C is an enlarged plan view of region XIC of the display apparatus of FIG. 11A.

In embodiments shown in FIGS. 11A to 11C, the light-blocking layer is omitted. The embodiment shown in FIG. 11A may be the same as the embodiment shown in FIG. 4 or 7A, in which the light-blocking layer is omitted. The embodiment shown in FIG. 11B may be the same as the embodiment shown in FIG. 4, in which the light-blocking layer is omitted in region V, or the embodiment shown in FIG. 7A, in which the light-blocking layer is omitted in region VIIB. The characteristics of the second touch electrode layer 430 described hereinafter are not necessarily limited to the second touch electrode layer 430 and may be likewise applied to the first touch electrode layer.

Referring to FIG. 11A, in an embodiment, the second touch electrode layer 430 may define first openings OP1 overlapping the sub-display area SDA and second openings OP2 overlapping the transmission area TA. Thus, the first openings OP1 of the second touch electrode layer 430 may overlap the first upper openings UOP1 (FIG. 4) of the light-blocking layer 510 (FIG. 4). Also, the second openings OP2 of the second touch electrode layer 430 may overlap the second upper openings UOP2 (FIG. 4) of the light-blocking layer 510 (FIG. 4). The second touch electrode layer 430 may include lines at least partially surrounding the first opening OP1 and the second opening OP2, similarly to the light-blocking portion of the light-blocking layer.

The bank layer 111 disposed below the second touch electrode layer 430 may be provided with a transmission opening overlapping each transmission area TA. The first to third sub-organic light-emitting diodes OLEDs1, OLEDs2, and OLEDs3 may be arranged in the sub-display area SDA. The bank layer 111 may be provided with an emission opening defining an emission area of each of the first to third sub-organic light-emitting diodes OLEDs1 to OLEs3. Thus, the bank layer 111 may include openings respectively overlapping the first to third sub-organic light-emitting diodes OLEDs1 to OLEDs3, rather than one opening entirely overlapping the sub-display area SDA. Also, the bank layer 111 may overlap the second touch electrode layer 430. Here, an entire area of the bank layer 111 may be greater than an area of the second touch electrode layer 430. Thus, the bank layer 111 may not be entirely covered by the second touch electrode layer 430.

The lines of the second touch electrode layer 430 may at least partially surround the first opening OP1 and/or the second opening OP2. In an embodiment, for example, the lines of the second touch electrode layer 430 may not be arranged on at least a side surface of the first opening OP1. In other words, at least one of the first openings OP1 may be spatially connected to at least one second opening OP2.

In an embodiment, for example, referring to FIG. 11B, the second touch electrode layer 430 may define a 1st-1 opening OP1-1, a 2nd-1 opening OP2-1, and a 2nd-2 opening OP2-2. The lines of the second touch electrode layer 430 may partially surround the 1st-1 opening OP1-1, the 2nd-1 opening OP2-1, and/or the 2nd-2 opening OP2-2. In an embodiment, for example, the lines of the second touch electrode layer 430 partially surrounding the 1st-1 opening OP1-1 may have a shape of an incomplete frame that is open in one or more directions.

According to an embodiment, the 2nd-1 opening OP2-1 may be arranged in a −x direction with respect to the 1st-1 opening OP1-1. According to an embodiment, the 2nd-2 opening OP2-2 may be arranged in a +y direction with respect to the 1st-1 opening OP1-1. According to an embodiment, the lines of the second touch electrode layer 430 may not be arranged between the 1st-1 opening OP1-1 and the 2nd-1 opening OP2-1 and between the 1st-1 opening OP1-1 and the 2nd-2 opening OP2-2. Thus, the 1st-1 opening OP1-1 and the 2nd-1 opening OP2-1 may be spatially connected to each other. The 1st-1 opening OP1-1 and the 2nd-2 opening OP2-2 may also be spatially connected to each other.

Referring to FIGS. 7B and 11B together, an area in which a portion of the light-blocking layer 510 is omitted in FIG. 7B may overlap an area between the 1st-1 opening OP1-1 and the 2nd-1 opening OP2-1 in FIG. 11B. Accordingly, even when a portion of the light-blocking layer 510 is omitted, the second touch electrode layer 430 may not be seen in a plan view.

Referring to FIG. 11C, the second touch electrode layer 430 may further include a second first opening (hereinafter will be referred to as "1st-2 opening") OP1-2 at a +x side with respect to the 2nd-2 opening OP2-2 and a third second opening (hereinafter, will be referred to as "2nd-3 opening") OP2-3 at a +y side with respect to the 1st-2 opening OP1-2.

The lines of the second touch electrode layer 430 may not be arranged between the 2nd-2 opening OP2-2 and the 1st-2 opening OP1-2. Thus, the 2nd-2 opening OP2-2 and the 1st-2 opening OP1-2 may be spatially connected to each other. Referring to FIG. 11A, in an embodiment, all of the 2nd-1 opening OP2-1, the 1st-1 opening OP1-1, the 2nd-2 opening OP2-2, and the 1st-2 opening OP1-2 may be spatially connected to each other. However, some of the lines of the second touch electrode layer 430 may be arranged between the 2nd-3 opening OP2-3 and the 1st-2 opening OP1-2. In an embodiment, for example, the 2nd-3 opening OP2-3 and the 1st-2 opening OP1-2 may be spatially separated from each other by a bridge portion 430-1 of the second touch electrode layer 430, the bridge portion 430-1 being arranged between the 2nd-3 opening OP2-3 and the 1st-2 opening OP1-2. According to an embodiment, the bridge portion 430-1 of the second touch electrode layer 430 may extend in the x direction.

The spacer SPC may be arranged between the first to third sub-organic light-emitting diodes OLEDs1, OLEDs2, and OLEDs3. The first to third sub-organic light-emitting diodes OLEDs1, OLEDs2, and OLEDs3 may be spaced apart from each other by the spacer SPC. However, the arrangement of the first to third sub-organic light-emitting diodes OLEDs1 to OLEDs3 and the spacer SPC is not limited to the arrangement illustrated in FIG. 11B or 11C and may be variously changed.

Referring back to FIG. 11A, the structure described with reference to FIGS. 11B and 11C may be repeatedly arranged. In an embodiment, for example, the spatial connection structure of the 2nd-1 opening OP2-1, the 1st-1 opening OP1-1, the 2nd-2 opening OP2-2, and the 1st-2 opening OP1-2 may be repeated. Also, the spatially separate structure of the 1st-2 opening OP1-2 and the 2nd-3 opening OP2-3 may be repeated. The relationship between the 2nd-3 opening OP2-3 and the first opening OP1 at a +x side with respect thereto may be substantially the same as the relationship between the 2nd-1 opening OP2-1 and the 1st-1 opening OP1-1. In other words, the 2nd-3 opening OP2-3 may be spatially connected with the first opening OP1 at the +x side with respect thereto. Also, the bridge portion 430-1 of the second touch electrode layer 430 may be repeatedly arranged in a multiple number, and the second touch electrode layer 430 may be integrally formed as a single unitary indivisible part throughout the component area CA. Accordingly, even when the lines of the second touch electrode layer 430 are omitted in some areas (for example, between the 1st-1 opening OP1-1 and the 2nd-1 opening OP2-1), all of the lines of the second touch electrode layer 430 in the component area CA may be electrically connected due to the bridge portions 430-1.

The spatial connection structure described above may be formed and/or repeated in various directions. According to an embodiment, as illustrated in FIG. 11A, the 2nd-1 opening OP2-1 may be arranged at a −x side with respect to the 1st-1 opening OP1-1 and the 2nd-2 opening OP2-2 may be arranged at a +y side with respect to the 1st-1 opening OP1-1. The 2nd-2 opening OP2-2 and the 2nd-3 opening OP2-3 may be arranged at a −x side and a +y side with respect to the 1st-2 opening OP1-2, respectively. Here, the bridge portion 430-1 may extend in the x direction and may be arranged between the 1st-2 opening OP1-2 and the 2nd-3 opening OP2-3 and may spatially separate the 1st-2 opening OP1-2 and the 2nd-3 opening OP2-3 from each other.

According to another embodiment, the 2nd-1 opening OP2-1 and the 2nd-2 opening OP2-2 may be arranged at a +x side and a −y side with respect to the 1st-1 opening OP1-1, respectively. The 2nd-2 opening OP2-2 and the 2nd-3 opening OP2-3 may be arranged at a +x side and a −y side of the 1st-2 opening OP1-2, respectively. Here, the bridge portion 430-1 may extend in the x direction and may be arranged between the 1st-2 opening OP1-2 and the 2nd-3 opening OP2-3 and may spatially separate the 1st-2 opening OP1-2 and the 2nd-3 opening OP2-3 from each other.

According to another embodiment, the 2nd-1 opening OP2-1 and the 2nd-2 opening OP2-2 may be arranged at the +x side and the +y side with respect to the 1st-1 opening OP1-1, respectively. The 2nd-2 opening OP2-2 and the 2nd-3 opening OP2-3 may be arranged at the +x side and the +y side of the 1st-2 opening OP1-2, respectively. Here, the bridge portion 430-1 may extend in the x direction and may be arranged between the 1st-2 opening OP1-2 and the 2nd-3 opening OP2-3 and may spatially separate the 1st-2 opening OP1-2 and the 2nd-3 opening OP2-3 from each other.

According to another embodiment, the 2nd-1 opening OP2-1 and the 2nd-2 opening OP2-2 may be arranged at the −x side and the −y side with respect to the 1st-1 opening OP1-1, respectively. The 2nd-2 opening OP2-2 and the 2nd-3 opening OP2-3 may be arranged at the −x side and the −y side with respect to the 1st-2 opening OP1-2, respectively. Here, the bridge portion 430-1 may extend in the x direction and may be arranged between the 1st-2 opening OP1-2 and the 2nd-3 opening OP2-3 and may spatially separate the 1st-2 opening OP1-2 and the 2nd-3 opening OP2-3 from each other.

According to another embodiment, the 2nd-1 opening OP2-1 and the 2nd-2 opening OP2-2 may be arranged at the −y side and the +y side with respect to the 1st-1 opening OP1-1, respectively. The 2nd-2 opening OP2-2 and the 2nd-3 opening OP2-3 may be arranged at the −y side and the +y side with respect to the 1st-2 opening OP1-2, respectively. Here, the bridge portion 430-1 may extend in the x direction and may be arranged between the 1st-2 opening OP1-2 and the 2nd-3 opening OP2-3 and may spatially separate the 1st-2 opening OP1-2 and the 2nd-3 opening OP2-3 from each other.

According to another embodiment, the 2nd-1 opening OP2-1 and the 2nd-2 opening OP2-2 may be arranged at the −x side and the +x side with respect to the 1st-1 opening OP1-1, respectively. The 2nd-2 opening OP2-2 and the 2nd-3 opening OP2-3 may be arranged at the −x side and the +x side with respect to the 1st-2 opening OP1-2, respectively. Here, the bridge portion 430-1 may extend in the y direction and may be arranged between the 1st-2 opening OP1-2 and the 2nd-3 opening OP2-3 and may spatially separate the 1st-2 opening OP1-2 and the 2nd-3 opening OP2-3 from each other.

However, the arrangement of the lines of the second touch electrode layer 430 and/or the spatial connection relationships of the first opening OP1 and the second opening OP2 are not limited to those described above and may be variously changed.

Figure 12A:
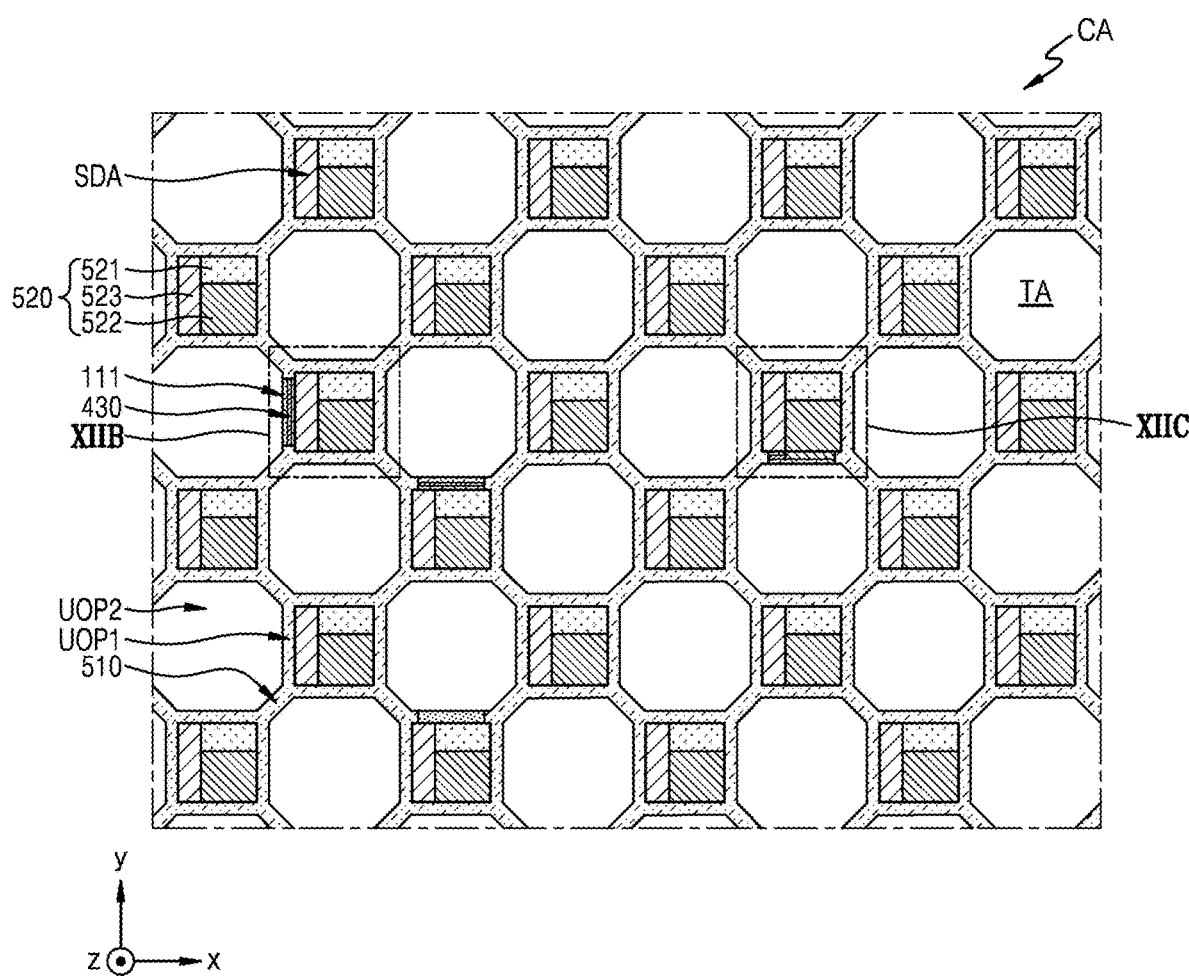
FIG. 12A is a plan view of a component area of a display apparatus according to another embodiment.
Figure 12B:
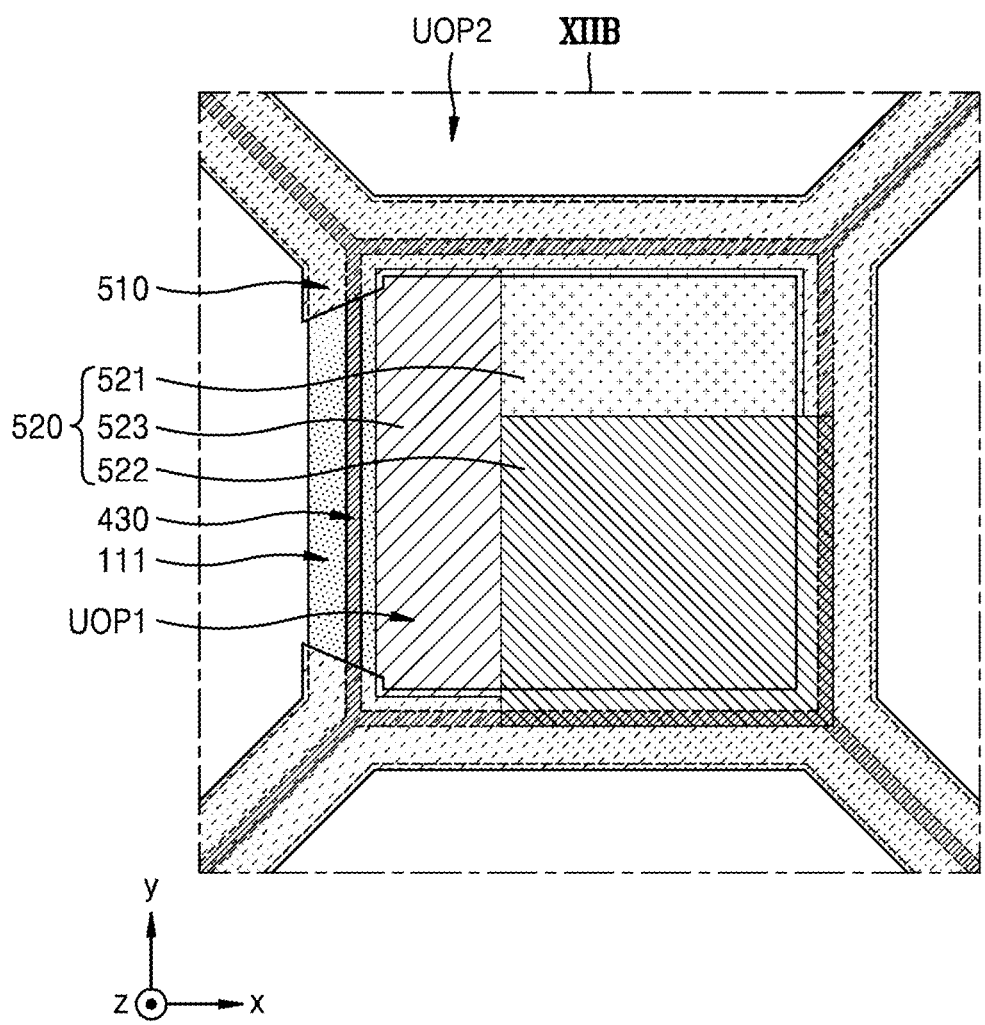
FIG. 12B is an enlarged plan view of region XIIB of the display apparatus of FIG. 12A.
Figure 12C:
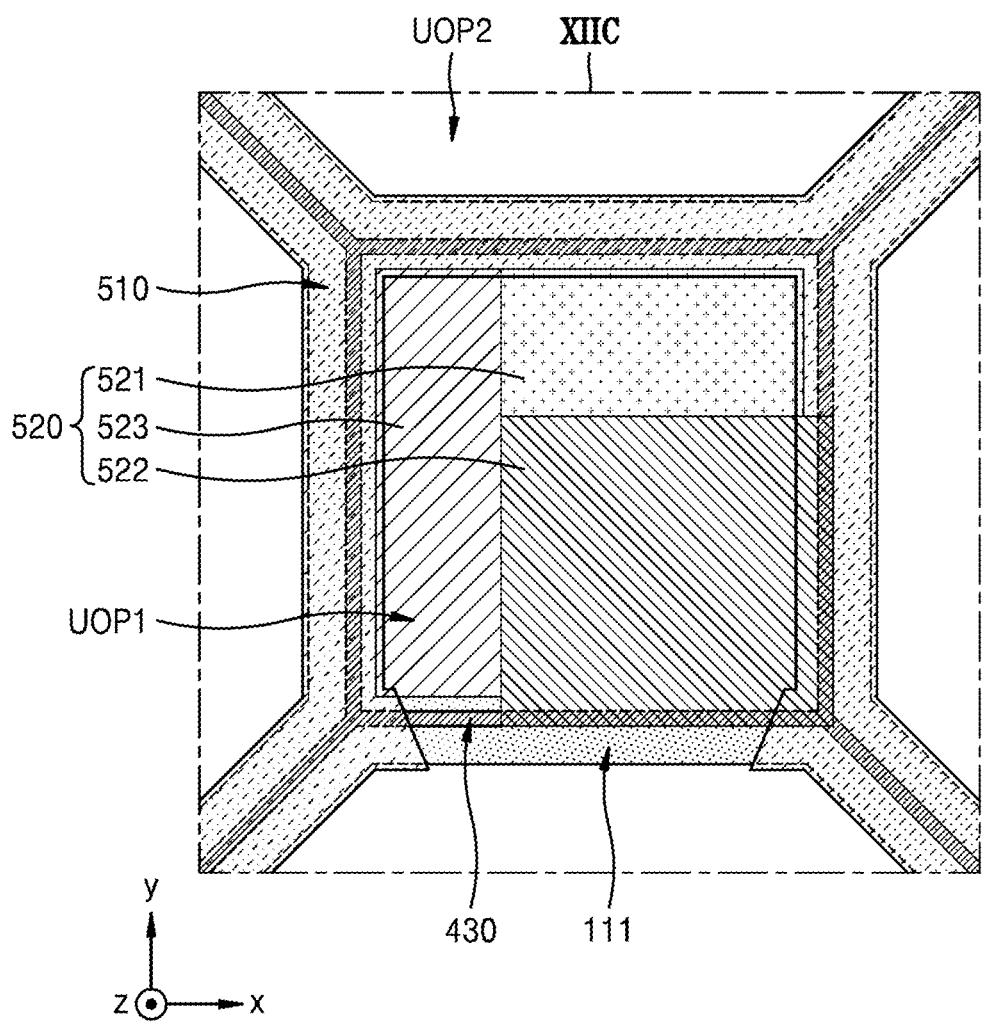
FIG. 12C is an enlarged plan view of region XIIC of the display apparatus of FIG. 12A.

FIG. 12A is a plan view of a component area of a display apparatus according to another embodiment. FIG. 12B is an enlarged plan view of region XIIB of the display apparatus of FIG. 12A. FIG. 12C is an enlarged plan view of region XIIC of the display apparatus of FIG. 12A.

Figure 13A:
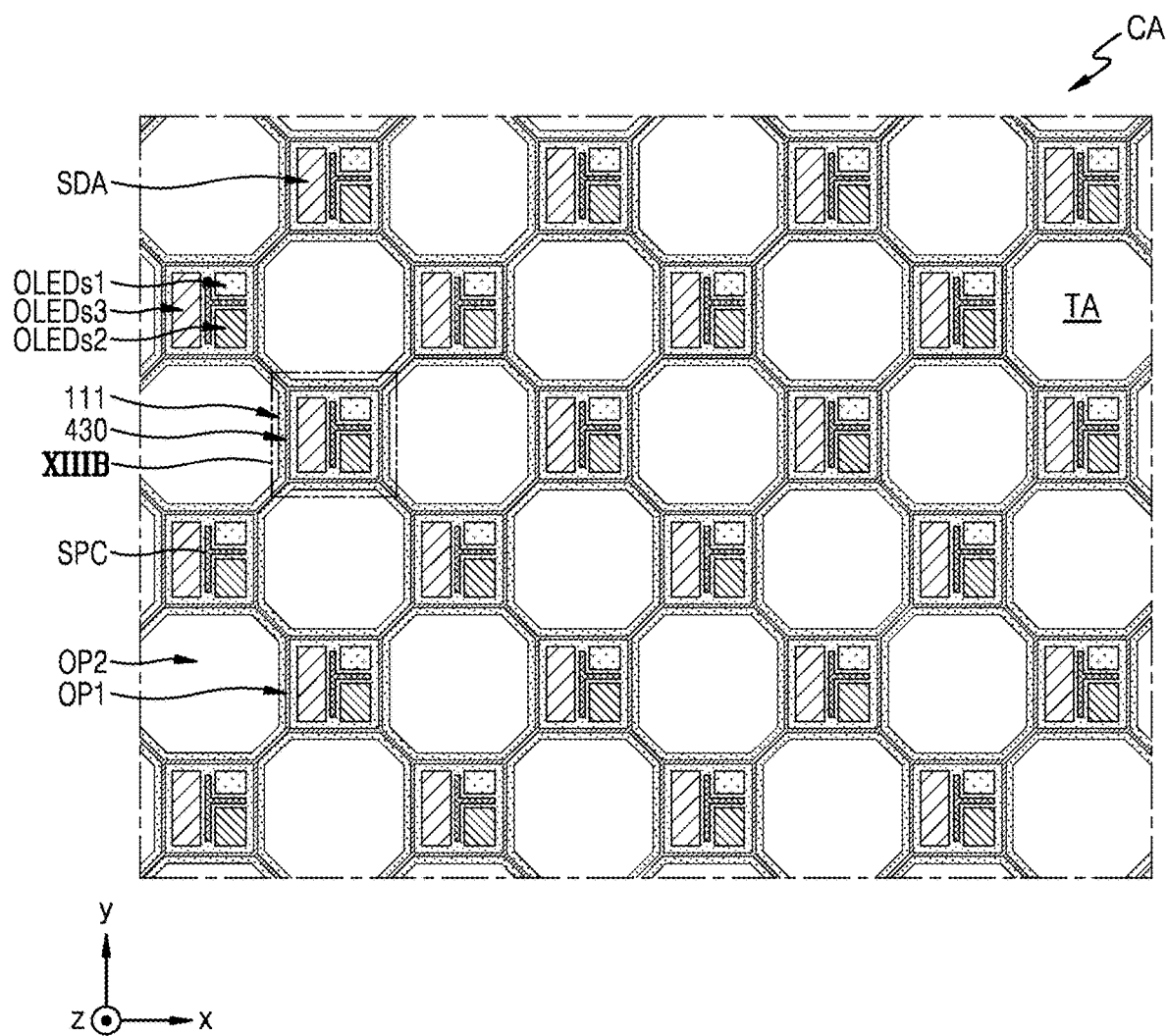
FIG. 13A is a plan view of a component area of a display apparatus according to another embodiment.
Figure 13B:
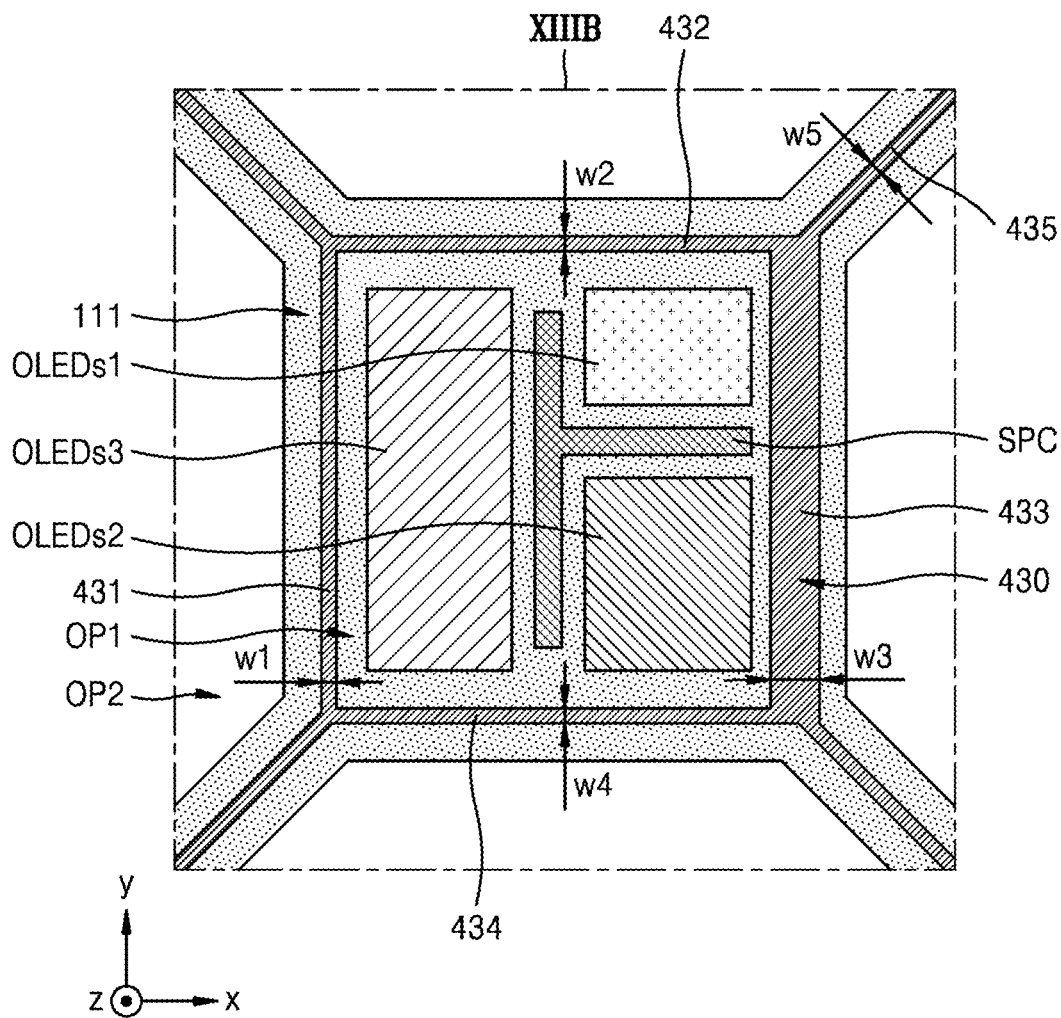
FIG. 13B is an enlarged plan view of a region of FIG. 13A.

FIG. 13A is a plan view of a component area of a display apparatus according to another embodiment. FIG. 13B is an enlarged plan view of a region of FIG. 13A. Particularly, FIG. 13B may be an enlarged plan view of region XIIIB of FIG. 13A.

In an embodiment, as shown in FIGS. 13A and 12B, the light-blocking layer is omitted. The embodiment shown in FIG. 13A may be the same as the embodiment shown in FIG. 12A, in which the light-blocking layer is omitted.

In an embodiment, as described above with reference to FIGS. 7A, 7B, 11A, 11B, and 11C, where a portion of the light-blocking layer 510 is omitted, a portion of the second touch electrode layer 430 may also be omitted, to prevent the phenomenon in which the second touch electrode layer 430 is seen.

According to another embodiment, as described below with reference to FIGS. 12A, 12B, 12C, 13A, and 13B, the second touch electrode layer 430 may not be removed in some areas in which the light-blocking layer 510 may be omitted, and rather, a width of the second touch electrode layer 430 may be reduced or minimized. Accordingly, even when a portion of the second touch electrode layer 430 is seen because a portion of the light-blocking layer 510 is omitted, the degree of visibility may be minimized through a reduced width thereof.

Referring to FIG. 12A, a portion of the light-blocking layer 510 may be omitted, and a portion of the second touch electrode layer 430 disposed below the light-blocking layer 510 may be exposed. As described above, the second touch electrode layer 430 may include metal and may thus reflect external light and may become visible to a user.

Referring to FIG. 12B, lines of the second touch electrode layer 430 may have a shape of a complete frame. Thus, when a portion of the light-blocking layer 510 is omitted, for example, a portion of the light-blocking layer at a −x side is omitted, some of the lines of the second touch electrode layer 430 may be seen. Here, the widths of the lines may be reduced or substantially thin to reduce the degree of visibility of the lines of the second touch electrode layer 430.

FIG. 12C illustrates an embodiment in which a portion of the light-blocking layer 510 at a −y side may be removed. The lines of the second touch electrode layer 430 in the corresponding area may also have reduced or thin widths to decrease the degree of visibility. Also, some of the lines of the second touch electrode layer 430 may be covered by the color filter 520, for example, the second color filter 522.

In an embodiment, as described above, where the widths of some of the lines of the second touch electrode layer 430 are reduced, the widths of the lines of the second touch electrode layer 430 may vary according to positions of the lines. Such features will hereinafter be described in detail below with reference to FIGS. 13A and 13B.

Referring to FIGS. 13A and 13B, the widths of the lines of the second touch electrode layer 430 may be variously changed.

In an embodiment, for example, as illustrated in FIG. 13B, the second touch electrode layer 430 may include a first portion 431, a second portion 432, a third portion 433, and a fourth portion 434 surrounding the first opening OP1. The second touch electrode layer 43e0 may include a fifth portion 435 arranged between adjacent second openings OP2. According to an embodiment, a width w1 of the first portion 431, a width w2 of the second portion 432, and a width w4 of the fourth portion 434 may be less than a width w3 of the third portion 433. According to an embodiment, a width w5 of the fifth portion 435 may be less than the width w3 of the third portion 433.

Referring back to FIG. 5, each light-blocking portion of the light-blocking layer 510 disposed on the second touch electrode layer 430 may have a different width. In an embodiment, for example, as described above, the width W1 of the first light-blocking portion 511, the width W2 of the second light-blocking portion 512, the width W3 of the third light-blocking portion 513, the width W4 of the fourth light-blocking portion 514, and/or the width W5 of the fifth light-blocking portion 515 may be different from each other. Thus, the possibility of loss of each light-blocking portion during a manufacturing process of a display apparatus may also be different from each other. In an embodiment, for example, the possibility of loss of the light-blocking portion during the manufacturing process of a display apparatus may be increased as the width of the light-blocking portion is reduced. Thus, it may be desirable that an embodiment has a structure in which some of the lines of the second touch electrode layer 430 are omitted or a structure in which widths of some of the lines of the second touch electrode layer 430 are less than widths of others of the lines of the second touch electrode layer 430, in an area overlapping a light-blocking portion of the light-blocking layer 510 having the highest possibility of loss during the manufacturing process of a display apparatus. In an embodiment, for example, where the width W1 of the first light-blocking portion 511 is less than the width W3 of the third light-blocking portion 513, the probability of loss of the first light-blocking portion 511 may be higher than the probability of loss of the third light-blocking portion 513 during the manufacturing process of a display apparatus. Thus, it is desirable that one or more of the lines of the second touch electrode layer 430 be removed or widths thereof be reduced, in an area overlapping the first light-blocking portion 511.

For example, according to an embodiment, referring to FIGS. 5, 7B, and 11B together, the width W1 of the first light-blocking portion 511 of FIG. 5 may be less than the width W3 of the third light-blocking portion 513. Thus, FIG. 7B illustrates an embodiment in which the probability of loss of the first light-blocking portion 511 may be higher than the probability of loss of the third light-blocking portion 513 during a manufacturing process of a display apparatus and the first light-blocking portion 511 is lost. Here, FIG. 11B illustrates an embodiment in which some of the lines of the second touch electrode layer 430, which overlap the first light-blocking portion 511, may be removed, so that the lines of the second touch electrode layer 430 disposed below the first light-blocking portion 511 may be effectively prevented from becoming visible because the first light-blocking portion 511 is lost.

According to an embodiment, referring to FIGS. 5, 12B, and 13B together, the width W1 of the first light-blocking portion 511 of FIG. 5 may be less than the width W3 of the third light-blocking portion 513. Thus, FIG. 12B illustrates an embodiment in which the probability of loss of the first light-blocking portion 511 may be higher than the probability of loss of the third light-blocking portion 513 during a manufacturing process of a display apparatus and the first light-blocking portion 511 is lost. Here, in order to reduce the degree of visibility of the lines of the second touch electrode layer 430 below the first light-blocking portion 511 due to the loss of the first blocking portion 511, the width w1 of the first portion 431 of the second touch electrode layer 430 may be formed to be less than the width w3 of the third portion 433. Here, an increase in resistance of the lines of the second touch electrode layer 430, which may occur when the width w1 of the first portion 431 is reduced, may be alleviated or compensated by increasing the width w3 of the third portion 433. In such an embodiment, the width w3 of the third portion 433 of the second touch electrode layer 430 may be desired to be less than the width W3 of the third light-blocking portion 513, such that the third portion 433 may be covered by the light-blocking layer 510.

Embodiments may have a structure in which some of the lines of the second touch electrode layer 430 are omitted, a structure in which widths of the lines of the second touch electrode layer 430 may be different from each other, or a combination thereof.

According to an embodiment, as described above, there are provided a display panel and an electronic device including the display panel, where the display panel is capable of reducing the phenomenon in which a touch electrode glitters and becomes visible to a user, by removing the touch electrode below the light-blocking layer in an area in which a portion of the light-blocking layer is lost in a component area.

The invention should not be construed as being limited to the embodiments set forth herein. Rather, these embodiments are provided so that this disclosure will be thorough and complete and will fully convey the concept of the invention to those skilled in the art While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel comprising: a substrate including a plurality of sub-display areas and a plurality of transmission areas; a plurality of display elements disposed on the substrate to correspond to the plurality of sub-display areas, respectively; a touch electrode layer disposed on the plurality of display elements, wherein the touch electrode layer defines a first first opening overlapping one of the plurality of sub-display areas and a first second opening and a second second opening overlapping two transmission areas of the plurality of transmission areas, respectively, wherein the first second opening and the second second opening are adjacent to the first first opening; and a light-blocking layer disposed on the touch electrode layer, wherein the light-blocking layer defines a first first upper opening overlapping the first first opening, a first second upper opening overlapping the first second opening, and a second second upper opening overlapping the second second opening, wherein the first second opening is arranged in a first direction with respect to the first first opening, the second second opening is arranged in a second direction with respect to the first first opening, a width of a portion of the light-blocking layer at a boundary between the first first upper opening and the first second upper opening is less than a wide of a portion of the light-blocking layer at a boundary between the first first upper opening and the second second upper opening, and the first second opening is spatially connected to the first first opening.

2. The display panel of claim 1, wherein the touch electrode layer includes lines at least partially surrounding the first first opening, the first second opening, and the second second opening, respectively, and the lines overlap the light-blocking layer.

3. The display panel of claim 2, further comprising: a first touch insulating layer disposed below the lines; and a second touch insulating layer disposed above the lines, wherein a lower surface of the second touch insulating layer directly below a light-blocking portion of the light-blocking layer arranged between at least one selected from the first second upper opening and the second second upper opening of the light-blocking layer and the first first upper opening of the light-blocking layer is in direct contact with an upper surface of the first touch insulating layer.

4. The display panel of claim 2, wherein one selected from the first second opening and the second second opening is spatially separated from the first first opening by a corresponding one of the lines of the touch electrode layer.

5. The display panel of claim 1, wherein the first first upper opening and the first second upper opening are spatially connected to each other.

6. The display panel of claim 5, further comprising: a touch insulating layer disposed between the light-blocking layer and the touch electrode layer; and an overcoat layer disposed on the light-blocking layer, wherein the touch insulating layer and the overcoat layer are in direct contact with each other in an area between the first first upper opening and the first second upper opening.

7. The display panel of claim 1, wherein the touch electrode layer further defines a second first opening overlapping a sub-display area adjacent to the second second opening and a third second opening overlapping a transmission area adjacent to the second first opening, and at least one selected from the second second opening and the third second opening is spatially connected to the second first opening.

8. An electronic device comprising: a display panel including a main display area and a component area; and a component disposed on a bottom surface of the display panel and overlapping the component area, wherein the display panel comprises: a substrate including a plurality of sub-display areas and a plurality of transmission areas in the component area; a plurality of display elements disposed on the substrate to correspond to the plurality of sub-display areas, respectively; a touch electrode layer disposed on the plurality of display elements, wherein the touch electrode layer defines a first first opening overlapping one of the plurality of sub-display areas and a first second opening and a second second opening overlapping two transmission areas of the plurality of transmission areas, respectively, wherein the first second opening and the second second opening are adjacent to the first first opening; and a light-blocking layer disposed on the touch electrode layer, wherein the light-blocking layer defines a first first upper opening overlapping the first first opening, a first second upper opening overlapping the first second opening, and a second second upper opening overlapping the second second opening, wherein the first second opening is arranged in a first direction with respect to the first first opening, the second second opening is arranged in a second direction with respect to the first first opening, a width of a portion of the light-blocking layer at a boundary between the first first upper opening and the first second upper opening is less than a wide of a portion of the light-blocking layer at a boundary between the first first upper opening and the second second upper opening, and the first second opening is spatially connected to the first first opening.

9. The electronic device of claim 8, wherein the display panel further comprises: a first touch insulating layer disposed below the touch electrode layer; and a second touch insulating layer disposed above the touch electrode layer, wherein a lower surface of the second touch insulating layer directly below a light-blocking portion of the light-blocking layer arranged between at least one selected from the first second upper opening and the second second upper opening of the light-blocking layer and the first first upper opening of the light-blocking layer is in direct contact with an upper surface of the first touch insulating layer.

10. The electronic device of claim 8, wherein the display panel further comprises: a touch insulating layer disposed between the light-blocking layer and the touch electrode layer; and an overcoat layer disposed on the light-blocking layer, wherein the first first upper opening and the first second upper opening are spatially connected to each other, and the touch insulating layer and the overcoat layer are in direct contact with each other in an area between the first first upper opening and the first second upper opening.

11. A display panel comprising:
a substrate including a sub-display area and a transmission area adjacent to the sub-display area; a display element disposed on the substrate to correspond to the sub-display area; a touch electrode layer disposed on the display element and defining an opening overlapping the sub-display area, wherein the touch electrode layer includes a line at least partially surrounding the opening, and a width of a first portion of the line extending in a first direction is less than a width of a second portion of the line extending in a second direction; and a light-blocking layer disposed on the touch electrode layer and defining an upper opening overlapping the opening of the touch electrode layer, wherein the light-blocking layer includes a light-blocking portion at least partially surrounding the upper opening, wherein the line of the touch electrode layer overlaps the light-blocking portion of the light-blocking layer.

12. The display panel of claim 11, further comprising:
a width of a first portion of the light-blocking portion is less than a width of a second portion of the light-blocking portion.

13. The display panel of claim 12, wherein the first portion of the light-blocking portion overlaps the first portion of the line of the touch electrode layer, and the second portion of the light-blocking portion overlaps the second portion of the line of the touch electrode layer.

14. The display panel of claim 12, wherein a width of the line of the touch electrode layer extending in the first direction is less than a width of the light-blocking portion of the light-blocking layer extending in the second direction.

15. The display panel of claim 11, wherein the display element includes: a first electrode; a bank layer covering an edge of the first electrode, wherein the bank layer defines an emission opening overlapping the first electrode; an emission layer overlapping the first electrode through the emission opening of the bank layer; and a second electrode on the emission layer, wherein the bank layer includes a light-absorptive material.

16. The display panel of claim 15, wherein a bank portion of the bank layer surrounding the emission opening overlaps the line of the touch electrode layer, and a width of the line of the touch electrode layer is less than a width of the bank portion of the bank layer.

17. The display panel of claim 15, wherein the bank layer includes a transmission opening overlapping the transmission area.

18. An electronic device comprising:
a display panel including a main display area and a component area; and
a component disposed on a bottom surface of the display panel and overlapping the component area,
wherein the display panel comprises:
a substrate including a sub-display area and a transmission area adjacent to the sub-display area;
a display element disposed on the substrate to correspond to the sub-display area; a touch electrode layer disposed on the display element, wherein the touch electrode layer defines an opening overlapping the sub-display area, wherein the touch electrode layer includes a line at least partially surrounding the opening, and a width of a first portion of the line extending in a first direction is less than a width of a second portion of the line extending in a second direction; and,
a light-blocking layer disposed on the touch electrode layer and defining an upper opening overlapping the opening of the touch electrode layer, wherein the light-blocking layer includes a light-blocking portion at least partially surrounding the upper opening, wherein the line of the touch electrode layer overlaps the light-blocking portion of the light-blocking layer.

19. The electronic device of claim 18, wherein a width of a first portion of the light-blocking portion extending in the first direction is less than a width of a second portion of the light-blocking portion extending in the second direction.

20. The electronic device of claim 19, wherein a width of the line of the touch electrode layer is less than a width of the light-blocking portion of the light-blocking layer.

* * * * *